(12) United States Patent
Higuchi et al.

(10) Patent No.: US 8,325,592 B2
(45) Date of Patent: Dec. 4, 2012

(54) COMMUNICATION DEVICE, MOBILE STATION, AND COMMUNICATION METHOD

(75) Inventors: Kenichi Higuchi, Yokohama (JP); Mamoru Sawahashi, Yokohama (JP); Zhengang Pan, Beijing (CN); Lan Chen, Beijing (CN); Jingxiu Liu, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 882 days.

(21) Appl. No.: 12/161,342

(22) PCT Filed: Jan. 11, 2007

(86) PCT No.: PCT/JP2007/050261
§ 371 (c)(1),
(2), (4) Date: Nov. 13, 2008

(87) PCT Pub. No.: WO2007/083568
PCT Pub. Date: Jul. 26, 2007

(65) Prior Publication Data
US 2010/0054191 A1 Mar. 4, 2010

(30) Foreign Application Priority Data

Jan. 18, 2006 (JP) .................................. 2006-010495
May 1, 2006 (JP) .................................. 2006-127990

(51) Int. Cl.
*H04J 11/00* (2006.01)
*H04J 1/00* (2006.01)
*H04L 27/28* (2006.01)

(52) U.S. Cl. .......................... 370/208; 370/343; 375/260

(58) Field of Classification Search ........................ None
See application file for complete search history.

(56) References Cited

U.S. PATENT DOCUMENTS

| | | | |
|---|---|---|---|
| 7,162,211 B2 | 1/2007 | Viswanath et al. | |
| 7,636,297 B1* | 12/2009 | Lee et al. | 370/208 |
| 2001/0053143 A1* | 12/2001 | Li et al. | 370/344 |
| 2003/0147358 A1* | 8/2003 | Hiramatsu et al. | 370/281 |
| 2003/0210670 A1* | 11/2003 | Kisigami et al. | 370/335 |
| 2005/0013327 A1* | 1/2005 | Koyanagi | 370/535 |
| 2005/0190725 A1* | 9/2005 | Wakisaka et al. | 370/334 |

(Continued)

FOREIGN PATENT DOCUMENTS

| | | |
|---|---|---|
| JP | 8-265244 A | 10/1996 |
| JP | 2003-347979 A | 12/2003 |
| JP | 2005-354708 A | 12/2005 |
| TW | 508960 B | 11/2002 |

OTHER PUBLICATIONS

International Search Report w/translation from PCT/JP2007/050261 dated Feb. 6, 2007 (5 pages).

(Continued)

*Primary Examiner* — Chirag Shah
*Assistant Examiner* — Suk Jin Kang
(74) *Attorney, Agent, or Firm* — Osha Liang LLP

(57) ABSTRACT

A communication device for sending transmission signals for one or more mobile stations from multiple transmitting antennas is disclosed. The communication device includes a scheduling unit configured to allocate one or more frequency resource blocks each having a predetermined bandwidth and including one or more subcarriers preferentially to each selected one of the mobile stations that is in a good channel condition; one or more delay setting units provided between the scheduling unit and the transmitting antennas and configured to set delay values for one or more signal paths leading to the transmitting antennas; and a delay value updating unit configured to repeatedly update the delay values to be set by the delay setting units.

11 Claims, 20 Drawing Sheets

U.S. PATENT DOCUMENTS

| | | | | |
|---|---|---|---|---|
| 2005/0254592 | A1* | 11/2005 | Naguib et al. | 375/267 |
| 2005/0281240 | A1* | 12/2005 | Oh et al. | 370/343 |
| 2005/0286562 | A1* | 12/2005 | Nakao et al. | 370/477 |
| 2006/0013186 | A1* | 1/2006 | Agrawal et al. | 370/344 |
| 2006/0077886 | A1* | 4/2006 | Oh et al. | 370/208 |
| 2006/0262869 | A1* | 11/2006 | Yoshida | 375/260 |
| 2006/0280114 | A1* | 12/2006 | Osseiran et al. | 370/208 |
| 2007/0098097 | A1* | 5/2007 | Khan et al. | 375/260 |
| 2007/0165566 | A1* | 7/2007 | Khan et al. | 370/329 |
| 2009/0197546 | A1* | 8/2009 | Kim et al. | 455/101 |
| 2009/0275352 | A1* | 11/2009 | Kim et al. | 455/509 |
| 2009/0300454 | A1* | 12/2009 | Miyoshi et al. | 714/748 |
| 2009/0304120 | A1* | 12/2009 | Agrawal et al. | 375/340 |
| 2010/0260240 | A1* | 10/2010 | Wang | 375/214 |

OTHER PUBLICATIONS

Written Opinion from PCT/JP2007/050261 dated Feb. 6, 2007 (4 pages).

"Multi-Degree Cyclic Delay Diversity with Frequency-domain Channel Dependent Scheduling"; 3GPP TSG RAN WG1 Meeting #44bis; R1-060991; Mar. 27-31, 2006; Internet <URL:http://www.3gpp.org/ftp/tsg_ran/WG1_RL1/TSGR1_44bis/Docs/R1-060991.zip>; pp. 1-5 (5 pages).

"Further Details on Adaptive Cyclic Delay Diversity Scheme"; 3GPP TSG RAN WG1 Meeting #42bis; Oct. 10-14, 2005; R1-051046; Internet <URL:http://www.3gpp.org/ftp/tsg_ran_/WG1_RL1/TSGR1_42bis/Docs/R1-051046.zip>; pp. 1-8 (8 pages).

Office Action issued in related Taiwanese patent application No. 09920386610; Dated Jun. 7, 2010 (7 pages).

esp@cenet Patent Abstract for Taiwanese Publication No. 508960; publication date Nov. 1, 2002 (1 page).

"System Performance of Adaptive Cyclic Delay Diversity Scheme"; 3GPP TSG RAN WG1 Meeting # 42bis, Oct. 10-14, 2005; Samsung, R1-051047; pp. 1-9 (9 pages); San Diego, CA, USA.

* cited by examiner

FIG.17

|  | DELAY VALUE |
|---|---|
| CANDIDATE NUMBER #1 | $\tau_1$ |
| CANDIDATE NUMBER #2 | $\tau_2$ |
| ⋮ | ⋮ |
| CANDIDATE NUMBER #n | $\tau_n$ |

FIG.21

| | DELAY VALUE | PHASE ROTATION ANGLE |
|---|---|---|
| CANDIDATE NUMBER #1 | $\tau 1$ | $\theta 1$ |
| CANDIDATE NUMBER #2 | $\tau 2$ | $\theta 2$ |
| CANDIDATE NUMBER #3 | $\tau 3$ | $\theta 3$ |
| CANDIDATE NUMBER #4 | $\tau 4$ | $\theta 4$ |

US 8,325,592 B2

COMMUNICATION DEVICE, MOBILE STATION, AND COMMUNICATION METHOD

CROSS-REFERENCE TO RELATED APPLICATIONS

This application is a national stage application of PCT/JP2007/050261, which claims priority to Japanese Patent Application No. 2006-010495 and Japanese Patent Application No. 2006-127990.

TECHNICAL FIELD

The present invention generally relates to wireless communication technologies. More particularly, the present invention relates to a communication device, a mobile station, and a communication method used in a system where frequency scheduling and delay diversity are performed.

BACKGROUND ART

In the field of wireless communication, there is a growing demand for a broadband wireless access system that can efficiently perform high-speed, high-volume communications. In next generation systems, use of frequency scheduling is proposed to improve the frequency efficiency and thereby to increase the throughput. In such a system, an available broad frequency band is divided into multiple frequency resource blocks each of which includes one or more subcarriers. The frequency resource blocks are also called frequency chunks. Each mobile station is allocated one or more frequency resource blocks. In a frequency scheduling method, to improve the transmission efficiency or the throughput of the entire system, the base station allocates frequency resource blocks preferentially to mobile stations in good channel conditions based on channel quality indicators (CQIs) sent from the mobile stations for the respective frequency resource blocks of the downlink pilot channel.

FIG. 1 is a graph showing channel quality indicators of mobile stations A and B on a frequency axis. The graph also shows frequency resource blocks 1 and 2. In FIG. 1, for the frequency resource block 1, the mobile station A is in a better channel condition than the mobile station B; and for the frequency resource block 2, the mobile station B is in a better channel condition than the mobile station A. In this case, the throughput of the entire system can be maximized by allocating the frequency resource block 1 to the mobile station A and the frequency resource block 2 to the mobile station B.

Meanwhile, in a method shown in FIG. 2, the number of incoming waves from the transmitting end to the receiving end is intentionally increased to achieve multipath diversity and thereby to improve the channel quality. Such a method is called delay diversity or cyclic delay diversity (CDD). As shown in FIG. 2, in a delay diversity scheme, delay elements are provided in signal paths so that the same signal is sent from multiple transmitting antennas at different timings.

Also, technologies combining frequency scheduling and delay diversity are proposed, for example, in non-patent documents 1 and 2.

[Non-patent document 1] Samsung, R1-051046, "Further details on adaptive cyclic delay diversity scheme", 3GPP TSG RAN WG1 meeting 42bis, San Diego, USA, 10-14 Oct., 2005

[Non-patent document 2] Samsung, R1-051047, "System performance of adaptive cyclic delay diversity scheme", 3GPP TSG RAN WG1 meeting 42bis, San Diego, USA, 10-14 Oct., 2005

DISCLOSURE OF INVENTION

Problems to be Solved by the Invention

Meanwhile, in a case where a receiver receives multiple incoming waves (paths) representing the same signal, there is a relationship between the interval (delay) between the paths and the variation (fading pitch) of the channel quality indicator (CQI) on a frequency axis. In FIG. 2, it is assumed that a transmitting antenna #2 sends a signal after a delay time $\tau$ from the time when a transmitting antenna #1 sends the signal. Also, for brevity, it is assumed that a signal sent from a transmitting antenna reaches the receiving end via one propagation path. As shown in FIG. 3A, if the delay time $\tau$ is small, the two paths are received at close timings at the receiving end. In this case, the CQI on the frequency axis changes comparatively slowly. On the other hand, as shown in FIG. 3B, if the delay time $\tau$ is large, the two paths are received at distant timings at the receiving end. In this case, the CQI on the frequency axis changes comparatively rapidly. When CQIs are comparatively constant in one frequency resource block but vary between different frequency resource blocks as shown in FIG. 1, it is possible to improve the throughput of the entire system by allocating frequency resource blocks as described above. However, when CQIs change frequently within a frequency resource block as shown in FIG. 4 (when the width of the frequency resource block and the fading pitch are not comparable), the difference in channel quality of the mobile stations are not apparent between frequency resource blocks, and therefore it is difficult to effectively allocate frequency resource blocks preferentially to mobile stations in good channel conditions. Therefore, in this case, it is difficult to improve the throughput of the entire system by frequency scheduling.

In non-patent documents 1 and 2, one of two types of delay values, small and large, are assigned to transmitting antennas depending on whether frequency scheduling is performed. With this method, because the small delay values are statically assigned to the transmitting antennas whenever frequency scheduling is performed, it is difficult, under certain communication conditions, to improve the transmission efficiency by frequency scheduling.

Embodiments of the present invention make it possible to solve or reduce one or more problems caused by the limitations and disadvantages of the background art, and provide a communication device and a communication method that are used in a communication system where frequency scheduling and delay diversity are performed and that can optimize delay values set for one or more signal paths leading to transmitting antennas.

Means for Solving the Problems

Embodiments of the present invention provide a communication device for sending transmission signals for one or more mobile stations from multiple transmitting antennas. The communication device includes a scheduling unit configured to allocate one or more frequency resource blocks each having a predetermined bandwidth and including one or more subcarriers preferentially to each selected one of the mobile stations that is in a good channel condition; one or more delay setting units provided between the scheduling unit and the transmitting antennas and configured to set delay values for one or more signal paths leading to the transmitting antennas; and a delay value updating unit configured to repeatedly update the delay values to be set by the delay setting units.

Advantageous Effect of the Invention

Embodiments of the present invention make it possible to optimize delay values set for one or more signal paths leading to transmitting antennas in a communication system where frequency scheduling and delay diversity are performed.

BRIEF DESCRIPTION OF THE DRAWINGS

FIG. 17 is a table showing delay value candidates used in an embodiment of the present invention;
FIG. 21 is a table showing delay value candidates and phase rotation angle candidates used in an embodiment of the present invention.

EXPLANATION OF REFERENCES

Figure 1:
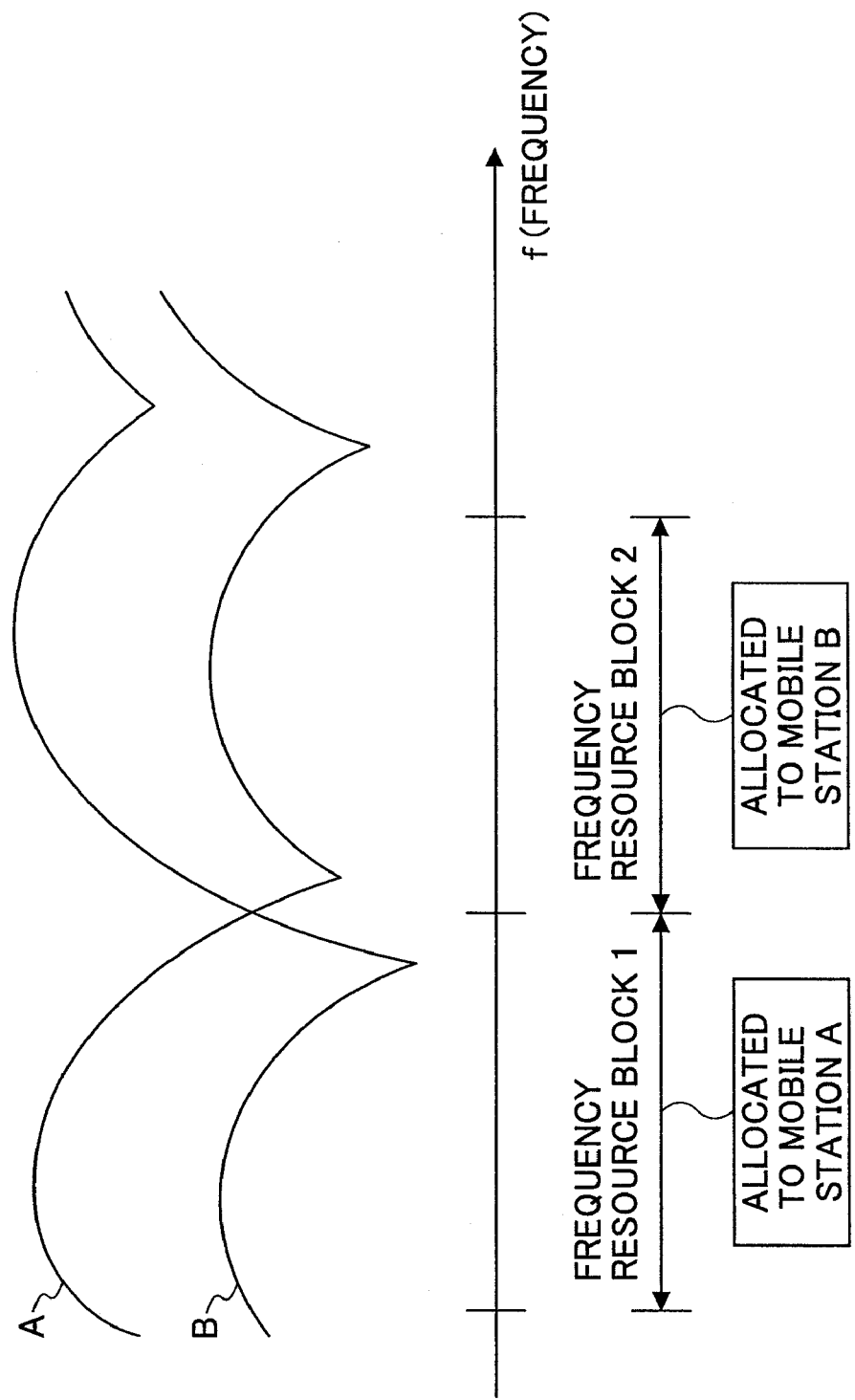
FIG. 1 is a graph used to describe principles of frequency scheduling.
Figure 2:
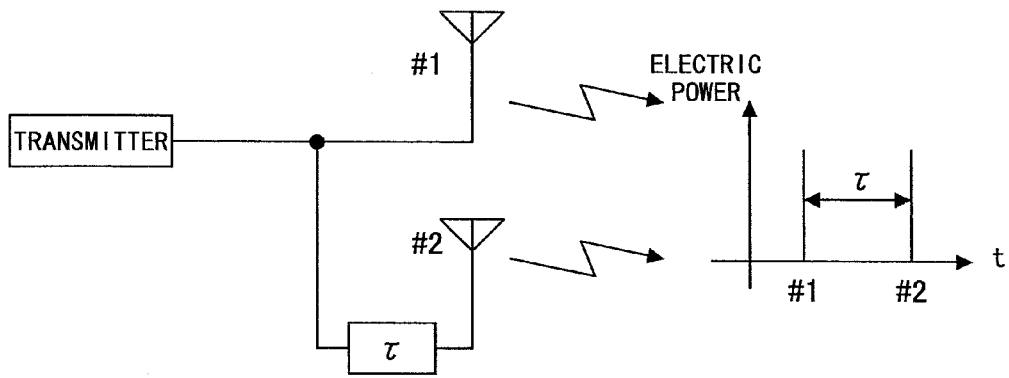
FIG. 2 is a drawing used to describe principles of delay diversity.
Figure 3A:
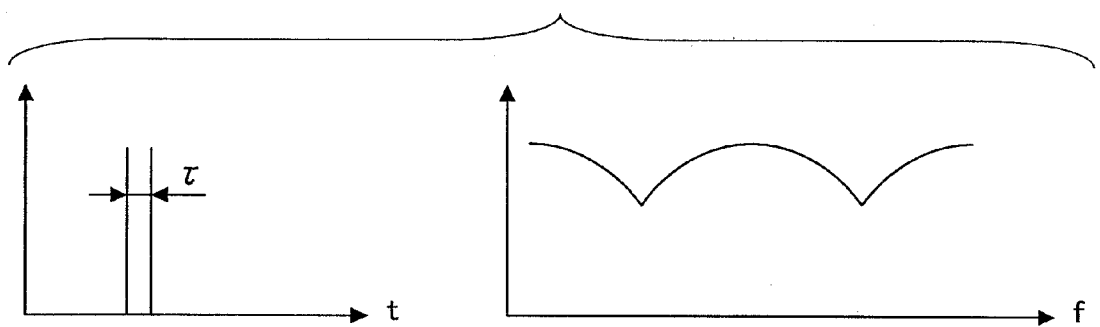
FIG. 3A is a set of graphs showing the variation of a CQI on a frequency axis when the delay value is small.
Figure 3B:
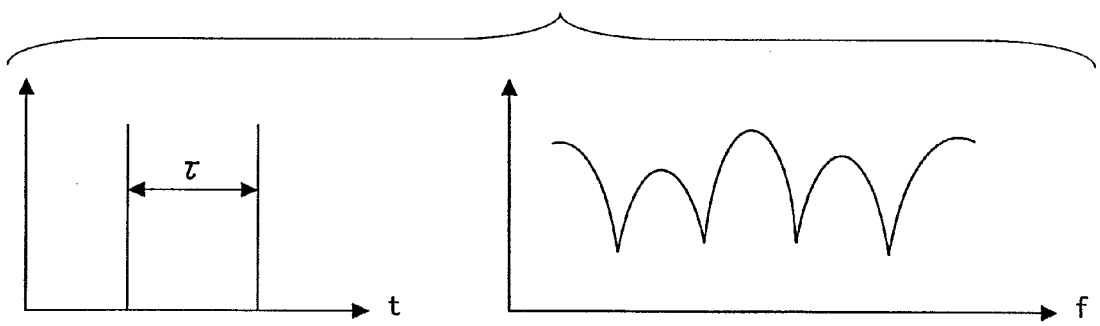
FIG. 3B is a set of graphs showing the variation of a CQI on a frequency axis when the delay value is large.

51-1 through 51-M Serial-parallel converter (S/P)
52-1 through 52-M Symbol mapping unit
53 Scheduler
54-1 through 54-M Inverse fast Fourier transformer (IFFT)
55 Delay generator
1-2 through 1-N, . . . , and M-2 through M-N Delay setting unit
56-1 through 56-N Multiplexing unit
57-1 through 57-N Cyclic prefix (CP) adder
81 Random number generator
82 Random delay calculation unit
83 Throughput averaging unit
84 Range calculation unit
85 Updating unit
91 OFDM receiver
92 Correlation detector
100 Scheduler
10-1 through 10-M CQI estimation unit
102 User selection unit
104 Delay generator
105 Combined delay profile generator
106 Frequency channel response calculation unit
107 CQI measuring unit
108 Memory
121, 161 OFDM receiver
122, 162, 163 Correlation detector
124, 165 Delay generator
125 Combined delay profile generator
126, 167 Frequency channel response calculation unit
127, 168 CQI measuring unit
128, 169 Memory
164 Delay value selecting unit
166 Antenna combined delay profile generator

BEST MODE FOR CARRYING OUT THE INVENTION

The best mode for carrying out the invention is described based on the following embodiments with reference to the accompanying drawings.

Throughout the accompanying drawings, the same reference numbers are used for parts having the same functions, and overlapping descriptions of those parts are omitted.

In a communication system according to an embodiment of the present invention, frequency scheduling and delay diversity using multiple transmitting antennas are performed, and delay values set for one or more signal paths leading to transmitting antennas are updated repeatedly. When delay values set for transmitting antennas of a base station are changed, the pitch of fading observed at each mobile station changes and, accordingly, the channel quality in each frequency resource block changes. Varying delay values causes the channel quality of mobile stations to differ and thereby makes it possible to improve the throughput by frequency diversity.

The delay values may be generated from random numbers. Using random numbers makes it easier to vary the delay values. When there are a large number of mobile stations, randomly varying the delay values is also preferable to achieve equality among the mobile stations.

According to another embodiment, the throughput of transmission signals is monitored by the base station and a range of delay values with which the throughput becomes greater than a predetermined value is calculated. Compared with a case where the delay values are completely randomly generated, this method makes it possible to generate the next set of delay values from random numbers within the calculated range and thereby to more effectively improve the throughput.

According to another embodiment of the present invention, delay values set for one or more transmitting antennas of a base station are determined based on feedback information from mobile stations. For example, the base station may be configured to receive delay profiles from the mobile stations. In this case, the base station calculates channel quality indicators for the respective frequency resource blocks based on the delay profiles from the mobile stations, and allocates one or more frequency resource blocks preferentially to each selected one of the mobile stations that is in a good channel condition. Using feedback information from the mobile stations makes it possible to adaptively determine delay values according to communication conditions. Also, this method makes it possible to adaptively determine delay values according to communication conditions regardless of the number of mobile stations.

Alternatively, the mobile stations may be configured to send delay values for one or more transmitting antennas and channel quality indicators estimated based on the delay values for the respective frequency resource blocks to the base station. This approach makes it possible to determine appropriate delay values while reducing the processing load of the base station.

First Embodiment

Figure 5:
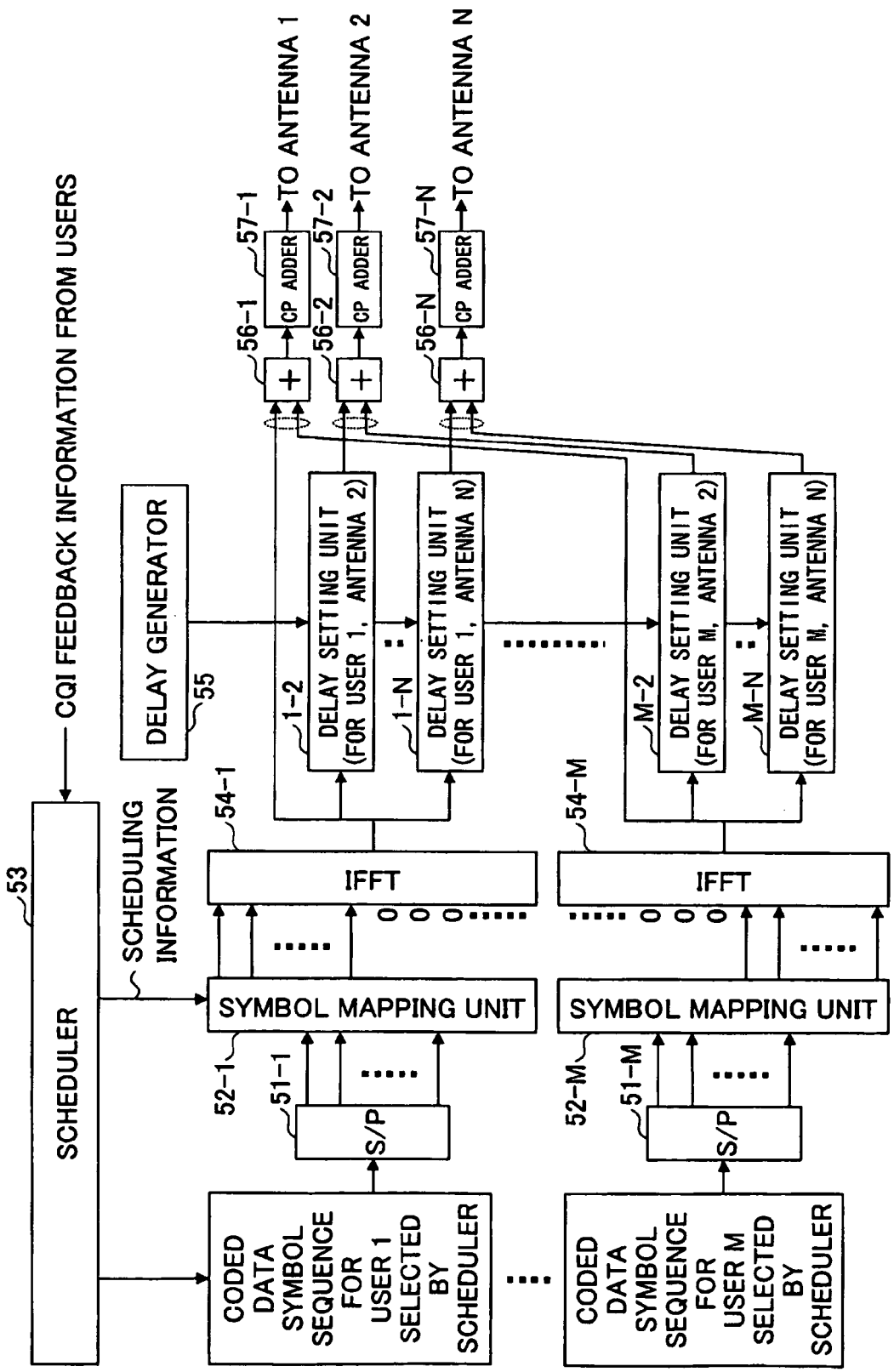
FIG. 5 is a partial block diagram of a base station according to an embodiment of the present invention.

FIG. 5 is a partial block diagram of a base station according to a first embodiment of the present invention. The base station shown in FIG. 5 includes serial-parallel converters (S/Ps) 51-1 through 51-M; symbol mapping units 52-1 through 52-M; a scheduler 53; inverse fast Fourier transformers (IFFTs) 54-1 through 54-M; a delay generator 55; delay setting units 1-2 through 1-N, . . . , and M-2 through M-N; multiplexing units 56-1 through 56-N; and cyclic prefix (CF) adders 57-1 through 57-N.

Each of the serial-parallel converters (S/Ps) 51-1 through 51-M converts a symbol sequence for the corresponding communication terminal (user) into a parallel symbol sequence. The communication terminal is typically a mobile station, but may also be a fixed station. The symbol sequence refers to a data symbol sequence to which error correction coding and any type of multilevel modulation are applied. In the example shown in FIG. 5, data symbols for M mobile stations are processed separately.

The symbol mapping units 52-1 through 52-M map data symbols for the mobile stations to frequency resource blocks based on scheduling information from the scheduler 53. The entire frequency band available in the system is divided into multiple frequency resource blocks each of which includes one or more subcarriers. The frequency resource blocks are also called frequency chunks. One or more frequency resource blocks may be allocated to one mobile station.

The scheduler 53 performs frequency scheduling based on CQIs sent from the mobile stations for the respective frequency resource blocks. The CQI refers to the quality of a downlink pilot channel and may be represented by, for example, an SIR or SINR. The scheduler 53 determines a mobile station in a good channel condition for each frequency resource block and allocates the frequency resource block preferentially to the determined mobile station. The scheduler 53 sends the scheduling information to the symbol mapping units 52-1 through 52-M.

The inverse fast Fourier transformers (IFFTs) 54-1 through 54-M inverse-fast-Fourier-transform the mapped data symbols of the respective mobile stations and thereby perform orthogonal frequency division multiplexing (OFDM) modulation on the data symbols. The modulated signal is replicated for the number of transmitting antennas N. In FIG. 5, "0" indicates a subcarrier of a frequency resource block that is not allocated to the mobile station.

The delay generator 55 determines delay values set for one or more signal paths leading to transmitting antennas. How to determine the delay values is described later in detail.

Figure 6:
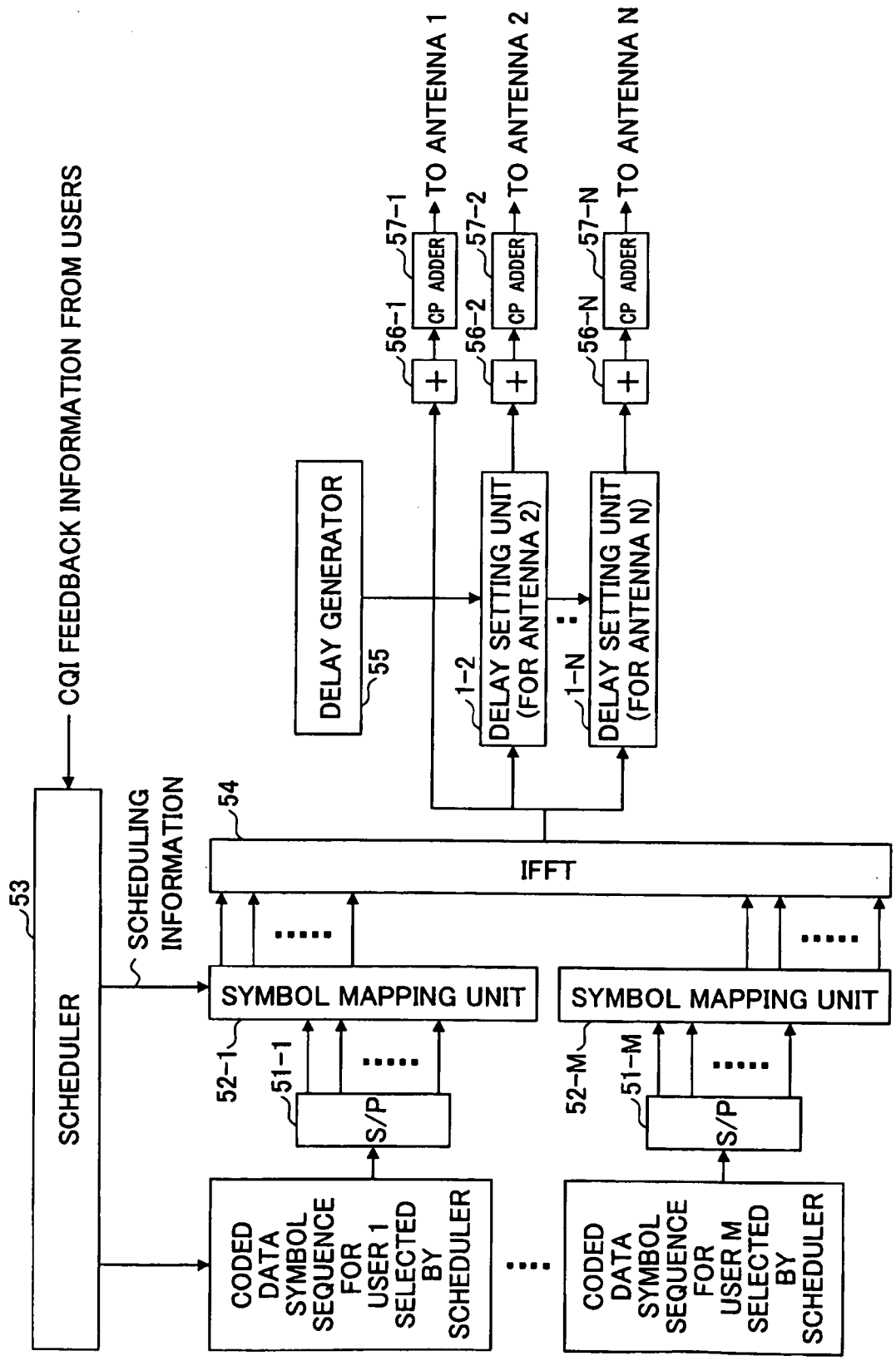
FIG. 6 is a partial block diagram of a base station according to another embodiment of the present invention.

The delay setting units 1-2 through 1-N, . . . , and M-2 through M-N set delay values for one or more signal paths leading to transmitting antennas based on a signal from the delay generator 55. The delay values are set for N−1 signal paths leading to transmitting antennas other than the first transmitting antenna because the delay values specify relative delays between N transmitting antennas. Alternatively, the delay values may be set for all N transmitting antennas including the first transmitting antenna. In FIG. 5, delay values are set separately for the respective frequency resource blocks and the respective mobile stations or users. Alternatively, the same delay values may be used for all frequency resource blocks as shown in FIG. 6. Also, delay values may be set separately for each group of frequency resource blocks.

The multiplexing units 56-1 through 56-N in FIG. 5 are provided for the respective transmitting antennas. Each of the multiplexing units 56-1 through 56-N multiplexes transmission signals for the mobile stations for the corresponding transmission antenna. The multiplicity corresponds to the number of users whose signals are transmitted concurrently.

Each of the cyclic prefix (CP) adders 57-1 through 57-N generates transmission symbols by adding a cyclic prefix (a guard interval) to the signal multiplexed by the corresponding multiplexing unit and outputs the transmission symbols to a subsequent processing unit so that the transmission symbols are sent from the corresponding transmitting antenna.

Figure 7:
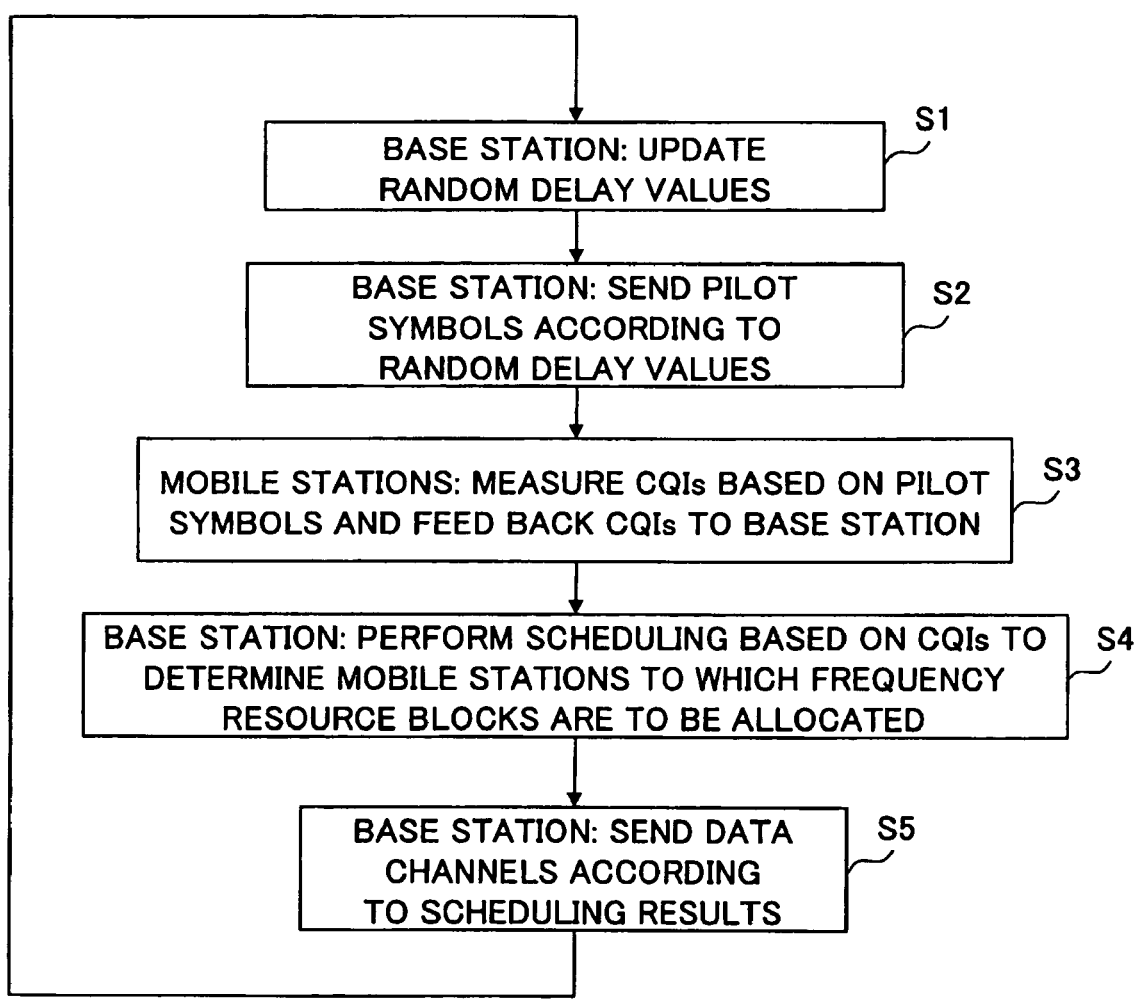
FIG. 7 is a flowchart showing an exemplary process in a communication system according to an embodiment of the present invention.

FIG. 7 is a flowchart showing an exemplary process in a communication system according to an embodiment of the present invention. In step S1, the base station determines delay values to be assigned to the transmitting antennas. In this embodiment, the delay generator 55 of FIG. 5 generates random numbers and the generated random numbers are used as the delay values. Then, the delay setting units 1-2 through 1-N, . . . , and M-2 through M-N of FIG. 5 set the determined delay values for the corresponding signal paths.

In step S2, pilot symbols (pilot channel) are sent from the N transmitting antennas at different timings according to the delay values.

In step S3, the mobile stations receive the pilot symbols and measure channel quality indicators (CQIs). The measured CQIs are fed back to the base station. The CQIs are measured for each frequency resource block and all of the measured CQIs are sent to the base station.

In step S4, the base station receives the CQIs from the mobile stations. Then, the scheduler 53 of the base station shown in FIG. 5 performs frequency scheduling of the downlink channel based on the CQIs. As a result, mobile stations to which frequency resource blocks are to be allocated are determined. As described above, a frequency resource block is allocated preferentially to a mobile station reporting a high CQI in the frequency resource block.

In step S5, data channels are sent to the mobile stations according to the scheduling results. For example, the scheduling results are sent to the mobile stations via an associated common control channel associated with a common data channel.

Figure 4:
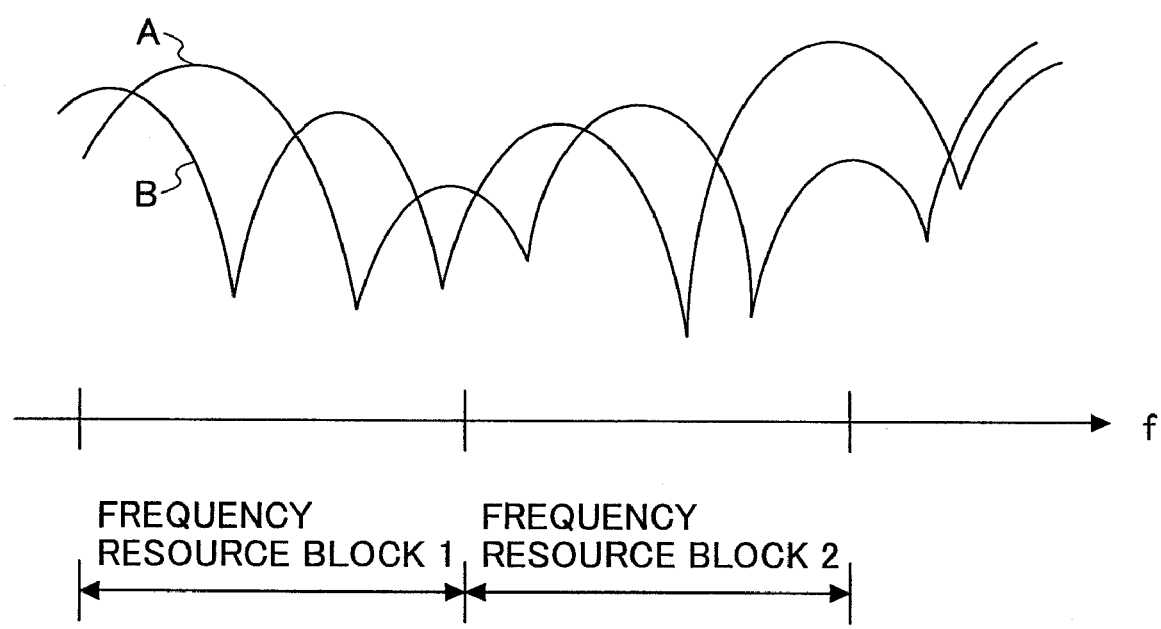
FIG. 4 is a graph showing a CQI changing rapidly in a frequency resource block.

Then, the process returns to step S1 where the random delay values are updated, and the subsequent steps described above are repeated. In this embodiment, delay values set for the transmitting antennas are determined randomly and are updated for every radio frame of, for example, 10 ms. As described above, the variation of the CQI on a frequency axis of a mobile station depends on the delay values set for the transmitting antennas. Accordingly, even when the bandwidth of the frequency resource block and the variation width (fading pitch) of the CQI of a user during a certain time period are substantially the same as shown in FIG. 1, those of another user during the same time period may be incomparable as shown in FIG. 4. Also, the situation may be different during another time period because the delay values are changed randomly. That is, as long as channel quality differences are generated between mobile stations (users), it is possible to improve the throughput of the entire system by allocating resources preferentially to mobile stations in good channel conditions. Also, randomly and frequently changing delay values is preferable to achieve equality among mobile stations. In the exemplary process shown in FIG. 7, the delay values are updated for each data channel transmission and for every radio frame. However, the update frequency may be greater or less than that described in the exemplary process.

Second Embodiment

Figure 8:
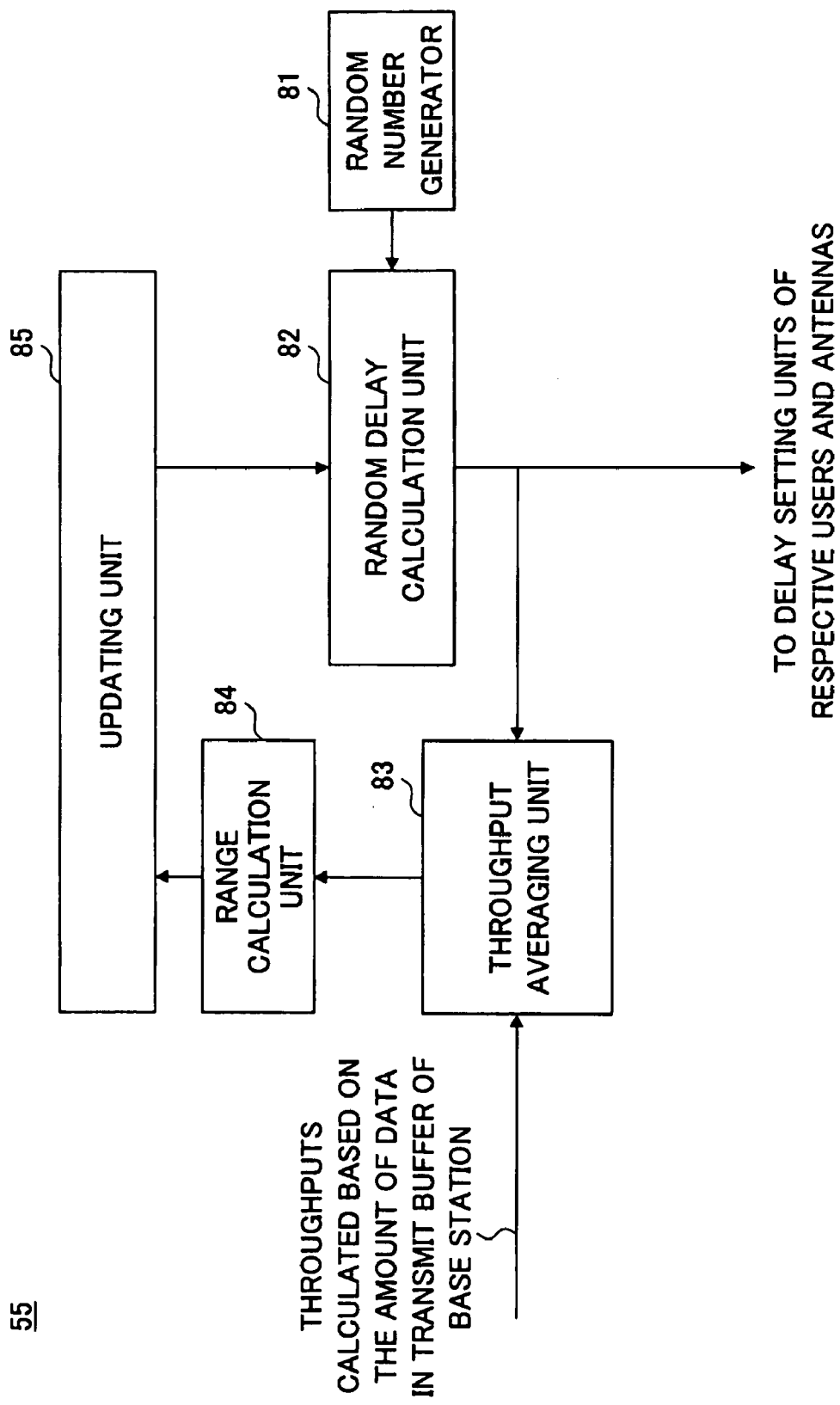
FIG. 8 is a detailed block diagram of a delay generator 55 shown in FIG. 5.

FIG. 8 is a detailed block diagram of the delay generator 55 shown in FIG. 5. The delay generator 55 according to a second embodiment of the present invention includes a random number generator 81, a random delay calculation unit 82, a throughput averaging unit 83, a range calculation unit 84, and an updating unit 85.

The random number generator 81 generates and outputs random numbers.

The random delay calculation unit 82 calculates delay values to be assigned to the antennas from the generated random numbers and sends the delay values to the corresponding delay setting units. One delay value may be generated from one random number, or multiple delay values may be generated from one random number. The random number generator 81 and the random delay calculation unit 82 are also included in the delay generator 55 of the first embodiment.

The throughput averaging unit 83 receives transmission throughputs calculated based on the amount of data in a transmit buffer (not shown) of the base station, averages the transmission throughputs, and correlates the averaged throughput with the delay values already assigned to the antennas. In other words, the throughput averaging unit 83 calculates and outputs an average throughput for the assigned delay values.

The range calculation unit 84 calculates and outputs a range of delay values with which the average throughput becomes greater than a predetermined threshold. In other words, the range calculation unit 84 calculates a numerical range of delay values with which the average throughput becomes greater than a predetermined level.

The updating unit 85 sets the numerical range calculated by the range calculation unit 84 as the range of next delay values to be generated and sends the range of next delay values to the random delay calculation unit 82.

In this embodiment, the random delay calculation unit 82 calculates delay values within the numerical range based on random numbers such that the average transmission throughput increases. In other words, in this embodiment, a numerical range of delay values is updated by learning to improve the average transmission throughput. Compared with the configuration of the first embodiment, the configuration of this embodiment makes it possible to more effectively improve the average transmission throughput. In the above example, the average throughput is monitored and the range of delay values is updated to improve the average throughput. Alternatively, the range of delay values may be determined and updated such that other characteristics (e.g., BER characteristics) are improved.

Also, instead of generating delay values each time from random numbers, the delay values may be selected repeatedly from predetermined values within a certain numerical range. In this case, the numerical range may be determined so as to improve the average throughput obtained as described above or determined from any other point of view.

Third Embodiment

In the first and second embodiments, the delay values to be assigned to the transmitting antennas are determined independently by the base station. According to a third embodiment of the present invention, delay values are determined based on feedback information from mobile stations.

Figure 9:
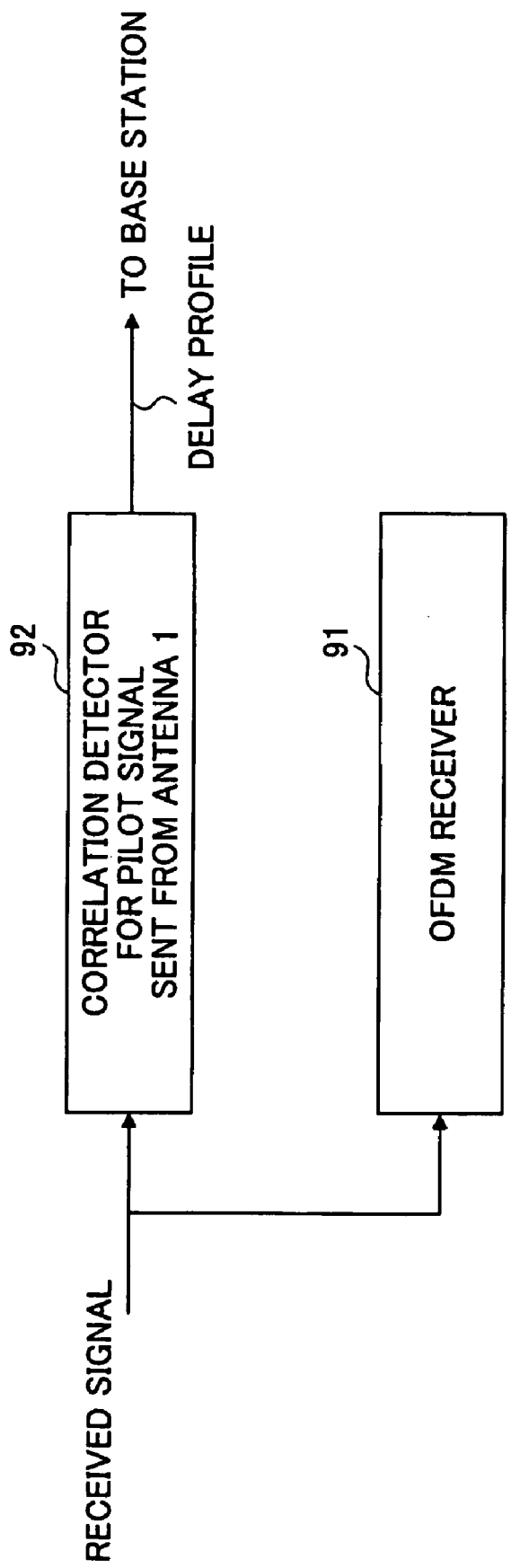
FIG. 9 is a schematic block diagram of a mobile station according to an embodiment of the present invention.

FIG. 9 is a schematic block diagram of a mobile station according to the third embodiment of the present invention. The mobile station of this embodiment includes an OFDM receiver 91 and a correlation detector 92. The OFDM receiver 91 OFDM-demodulates (Fourier-transforms) a received signal and restores data in the received signal. The correlation detector 92 calculates the correlation between a received signal (pilot channel) and a pilot channel replica and outputs the correlation calculation result. Specifically, the correlation detector 92 calculates the correlation between a pilot channel and a pilot channel replica sent from one transmitting antenna of the base station and received by the mobile station. For example, before starting communications, the base station sends a pilot channel only from one of N transmitting antennas and the mobile station receives the pilot channel. Because a radio signal normally propagates via multiple paths, a received signal includes multiple incoming waves (a group of paths) extending over a certain time range. The correlation calculation result provides a delay profile showing such multiple paths. In this embodiment, information (e.g., electric power and timings of paths) representing the delay profile is fed back to the base station.

Figure 10:
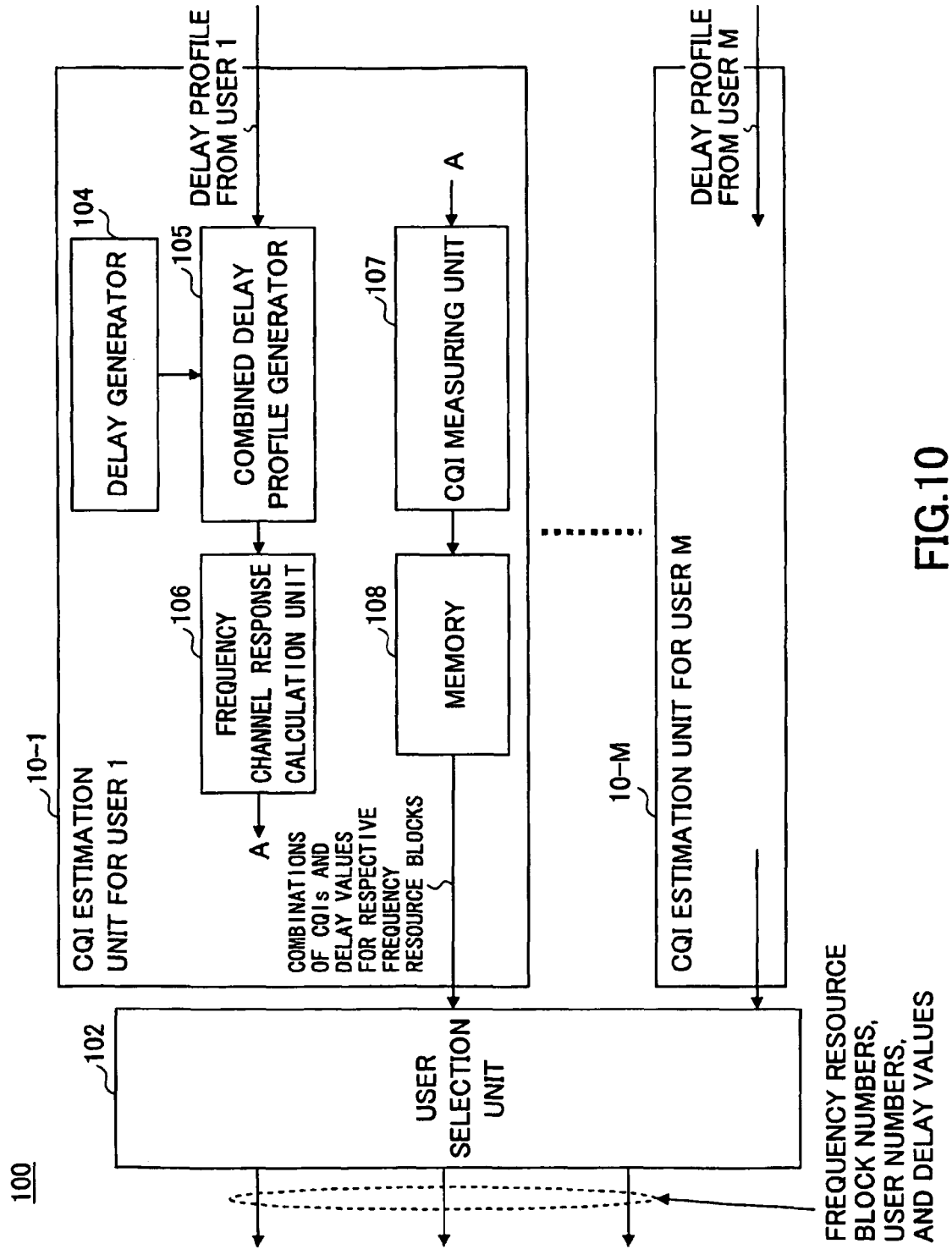
FIG. 10 is a detailed block diagram of a scheduler.

FIG. 10 is a detailed block diagram of a scheduler of a base station according to the third embodiment of the present invention. A scheduler 100 shown in FIG. 10 can be used in place of the scheduler 53 of FIG. 5. The scheduler 100 includes CQI estimation units 10-1 (for user 1) through 10-M (for user M) and a user selection unit 102. The CQI estimation units 10-1 through 10-M provided for the respective users have substantially the same configuration and functions. Therefore, the descriptions below of the CQI estimation unit 10-1 for user 1 may also apply to other CQI estimation units. The CQI estimation unit 10-1 for user 1 includes a delay generator 104, a combined delay profile generator 105, a frequency channel response calculation unit 106, a CQI measuring unit 107, and a memory 108.

The CQI estimation units 10-1 through 10-M output CQIs estimated for the respective users and delay values that achieve those CQIs for each frequency resource block.

The user selection unit 102 determines users (mobile stations) suitable to allocate frequency resource blocks based on the CQIs and outputs the result as scheduling information.

The delay generator 104 of the CQI estimation unit 10-1 outputs delay values for one or more transmitting antennas. The delay values are not actually set for the transmitting antennas at this stage, but are used for calculation in the CQI estimation unit 10-1.

The combined delay profile generator 105 receives a delay profile for one of the transmitting antennas from the mobile station and tentative delay values from the delay generator 104, and generates combined delay profiles that may be observed at the mobile station if pilot channels are sent from the N transmitting antennas using the tentative delay values.

The frequency channel response calculation unit 106 converts the combined delay profiles into frequency domain response characteristics.

The CQI measuring unit 107 measures CQIs for the respective frequency resource blocks based on the frequency domain response characteristics.

Calculation of the combined delay profiles, calculation of the frequency domain response characteristics, and measurement of CQIs are performed based on various delay values.

The memory 108 stores all or a part of the CQIs and the delay values. The memory 108 stores at least the highest CQI and the corresponding delay value(s) for each frequency resource block.

Figure 11:
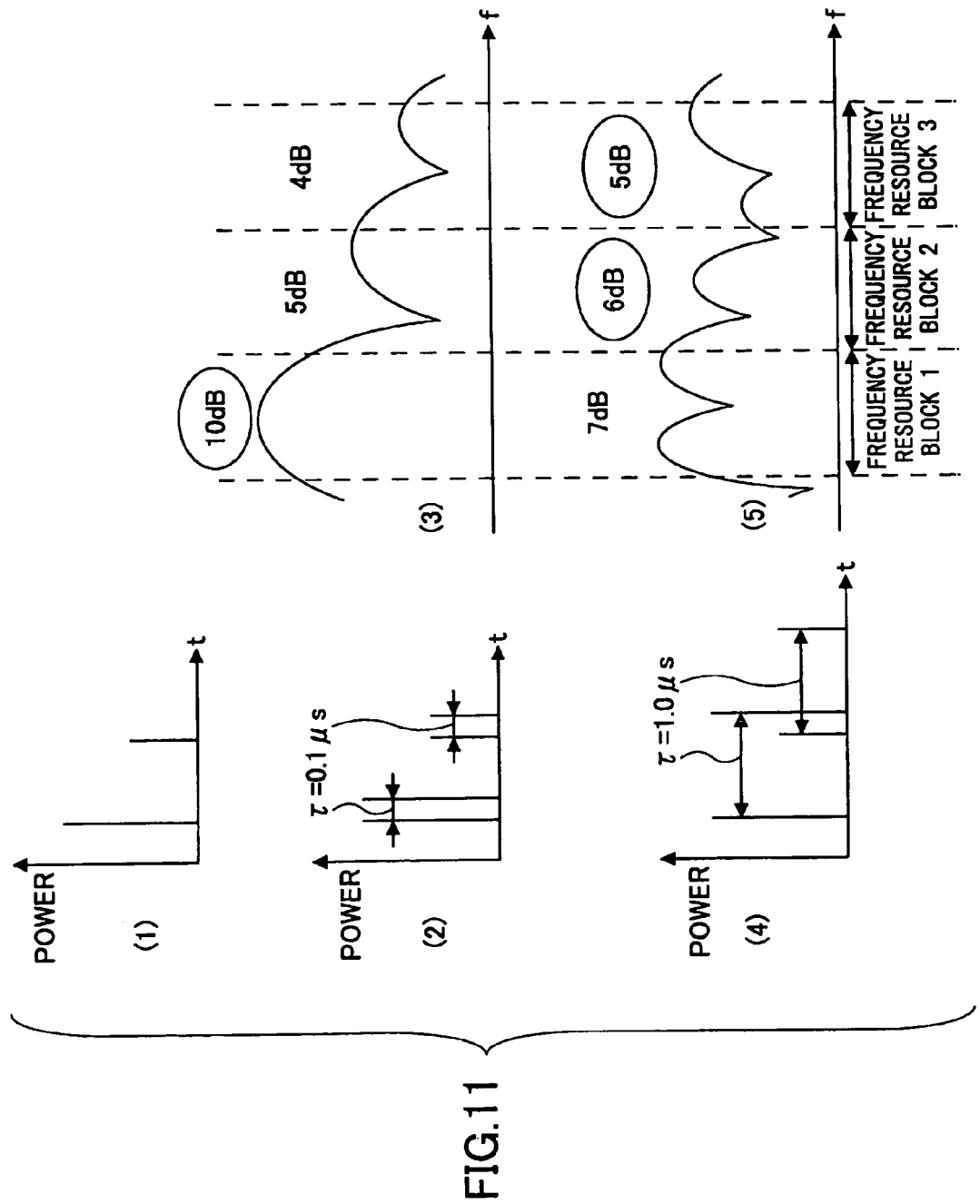
FIG. 11 is a set of graphs showing a delay profile, combined delay profiles, and frequency response characteristics.

An exemplary process of this embodiment is described below with reference to FIG. 11. In this exemplary process, it is assumed that two transmitting antennas are used, and a delay value τ0 to be assigned to one of the two transmitting antennas is set at 0.1 µs by the delay generator 104. It is also assumed that the base station (scheduler) has already received a delay profile as shown in FIG. 11 (1) regarding one transmitting antenna from the mobile station. In this example, as shown in FIG. 11 (1), when a pilot channel is transmitted from one transmitting antenna, two paths are observed at the receiving end. When pilot channels are sent from the two transmitting antennas with the delay value τ of 0.1 µs, each path observed at the mobile station is accompanied by a path arriving 0.1 µs later as shown by the combined delay profile of FIG. 11 (2). The combined delay profile is converted into response characteristics on a frequency axis as shown in FIG. 11 (3). In this example, it is assumed that there are three frequency resource blocks 1, 2, and 3. The CQI measuring unit 107 calculates average CQIs, e.g., 10 dB, 5 dB, and 4 dB, for the respective frequency resource blocks 1, 2, and 3.

Similarly, the CQI measuring unit 107 calculates CQIs for another delay value. In this example, a combined delay profile as shown in FIG. 11 (4) and frequency responses as shown in FIG. 11 (5) are obtained using a delay value τ of 1.0 µs. Then, the CQI measuring unit 107 calculates average CQIs, e.g., 7 dB, 6 dB, and 5 dB, for the respective frequency resource blocks 1, 2, and 3. The memory 108 may be configured to store all the calculated CQIs and the delay values τ. In this embodiment, however, the memory 108 stores only values achieving a good channel quality for the respective frequency resource blocks. For example, the memory 108 stores τ=0.1 µs and CQI=10 dB for the frequency resource block 1, τ=1.0 µs and CQI=6 dB for the frequency resource block 2, and τ=1.0 µs and CQI=5 dB for the frequency resource block 3. Because the user selection unit 102 allocates a resource to a user in the best channel condition, the user selection unit 102 needs only the highest CQI and the corresponding delay value(s) for each user. In other words, other values are not used even if they are input to the user selection unit 102.

In the exemplary process described above, CQIs are calculated for each of the two delay values. However, CQIs may be calculated for more than two delay values. Generally, when there are $N_T$ transmitting antennas, $N_T$-1 delay values may be set for each user. The CQI estimation unit 10-1 may be configured to estimate and store CQIs for all those delay values. Alternatively, delay values may be indicated by relative values to reduce the number of combinations of delay values to be handled. For example, $N_T$-1 delay values may be represented by integral multiples of a reference delay value Δ. Take, for example, a case where four transmitting antennas ($N_T$=4) are used. In this case, delay values to be assigned to three of the four transmitting antennas are represented by Δ, 2Δ, and 3Δ. This method makes it possible to reduce the processing load of the scheduler 100.

Fourth Embodiment

In the third embodiment, CQIs and the corresponding delay values are calculated by the base station. In a fourth embodiment of the present invention, CQIs and delay values are calculated by the respective mobile stations and sent to the base station. In the third and fourth embodiments, substantially the same process is performed by a system including a base station and mobile stations. However, the fourth embodiment is different from the third embodiment in that the calculations are performed by the mobile stations.

Figure 12:
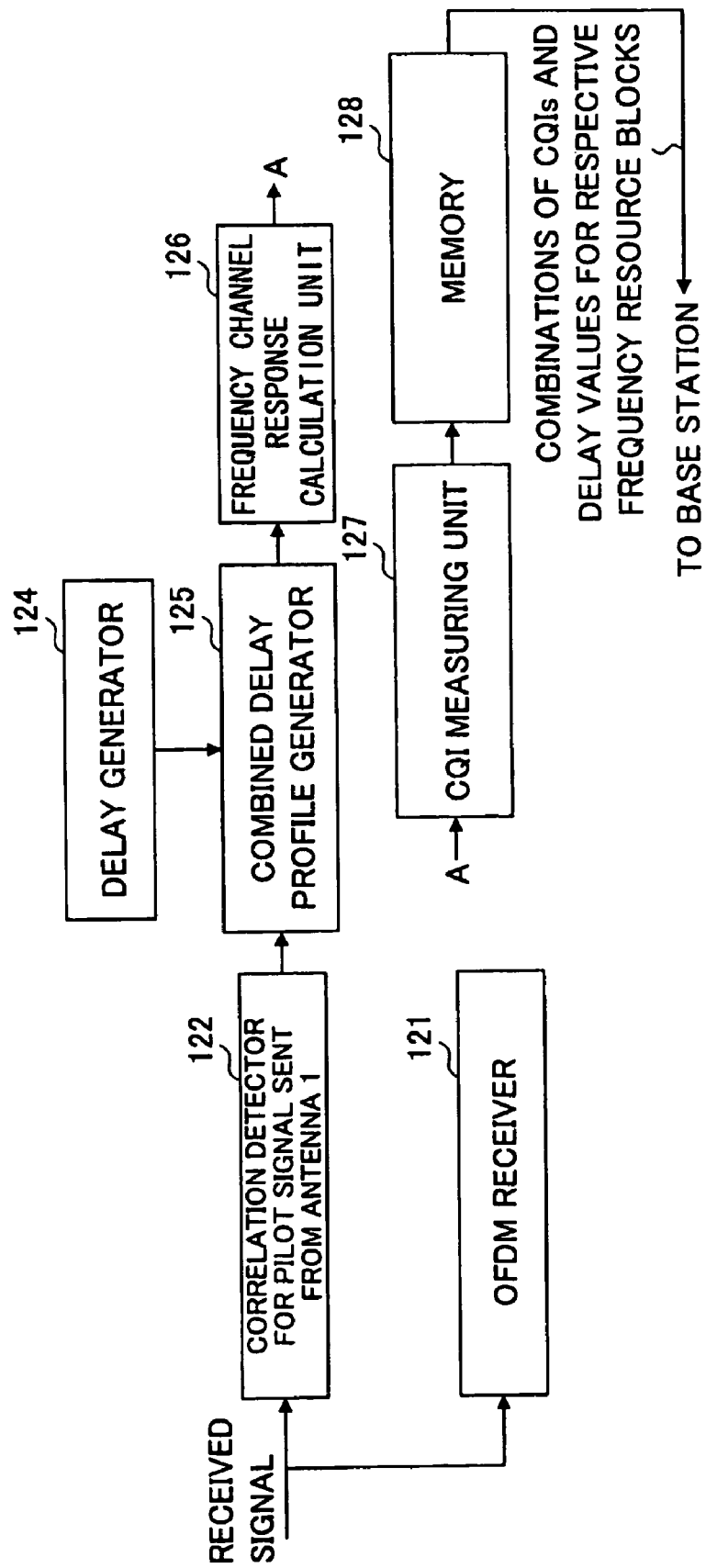
FIG. 12 is a schematic block diagram illustrating a mobile station according to another embodiment of the present invention.

FIG. 12 is a schematic block diagram of a mobile station according to the fourth embodiment of the present invention. The mobile station of this embodiment includes an OFDM receiver 121, a correlation detector 122, a delay generator 124, a combined delay profile generator 125, a frequency channel response calculation unit 126, a CQI measuring unit 127, and a memory 128. The OFDM receiver 121 and the correlation detector 122, respectively, have substantially the same configurations and functions as those of the OFDM receiver 91 and the correlation detector 92 shown in FIG. 9. The delay generator 124, the combined delay profile generator 125, the frequency channel response calculation unit 126, the CQI measuring unit 127, and the memory 128, respectively, have substantially the same configurations and functions as those of the delay generator 104, the combined delay profile generator 105, the frequency channel response calculation unit 106, the CQI measuring unit 107, and the memory 108 shown in FIG. 10.

Figure 13:
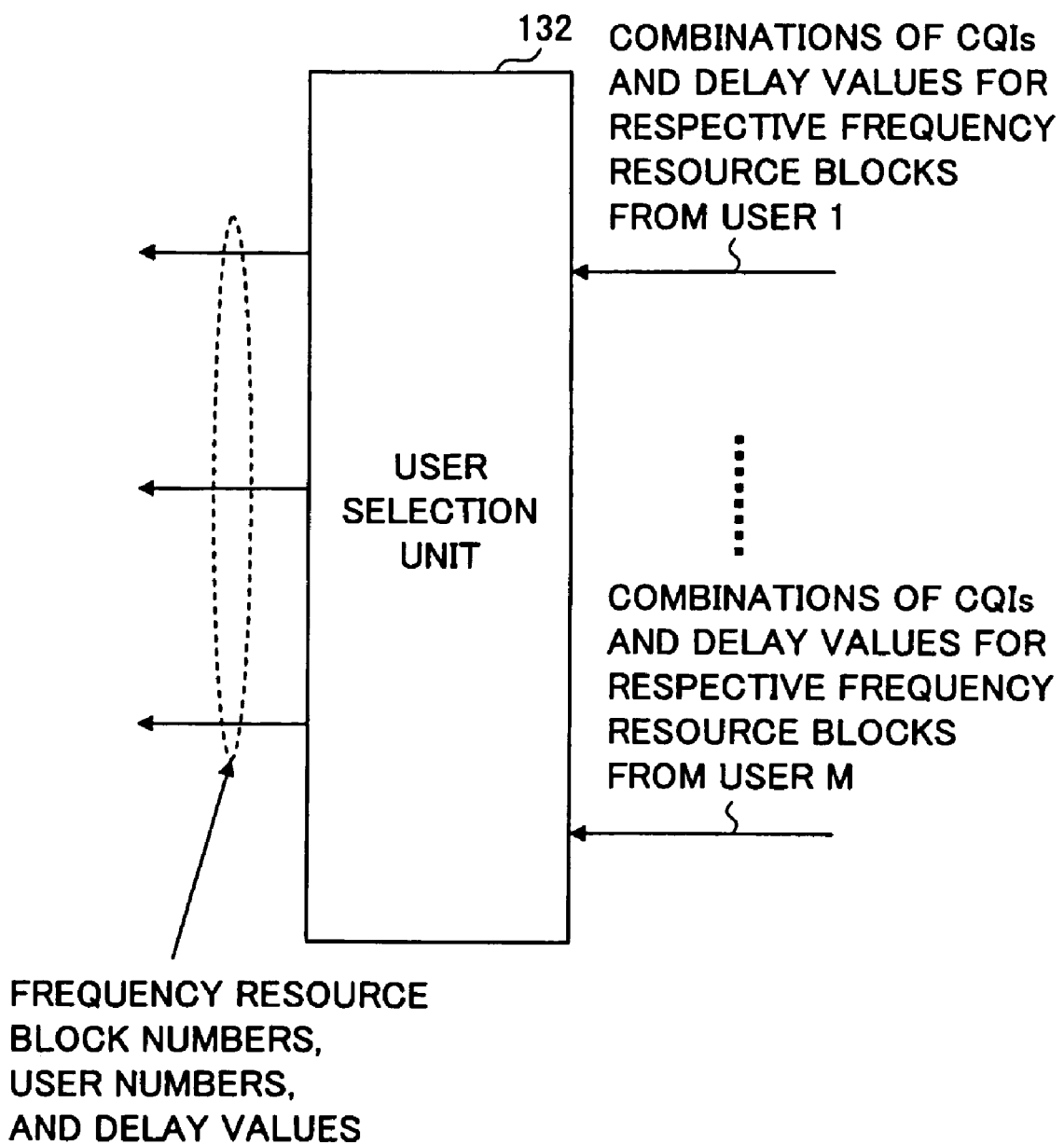
FIG. 13 is a block diagram of a scheduler according to another embodiment of the present invention.

FIG. 13 is a block diagram of a scheduler of a base station according to the fourth embodiment of the present invention. The scheduler includes a user selection unit 132 having substantially the same configuration and functions as those of the user selection unit 102 shown in FIG. 10.

In this embodiment, each mobile station estimates CQIs based on various delay values τ for each frequency resource block and feeds back the highest CQI and the corresponding delay value(s) for each frequency resource block to the base station. The fed back information is input to the user selection unit 132 of FIG. 13. Then, the user selection unit 132 determines a user with the highest of the highest CQIs for each frequency resource block and allocates the frequency resource block to the user.

Fifth Embodiment

In the above embodiments, delay times are adaptively controlled either by determining optimum delay values based on channel quality indicators of mobile stations, or by randomly changing delay values and selecting optimum delay values based on the measured throughput.

As described above, the following two methods may be used to determine optimum delay values based on channel quality indicators of mobile stations and thereby to adaptively control delay times:

Mobile stations calculate and feed back delay profiles, and the base station determines optimum delay values.

Mobile stations calculate delay profiles, determine optimum delay values based on the delay profiles, and feed back the optimum delay values to the base station.

One disadvantage of the above methods is that the feedback information sent from the mobile stations to the base station is relatively large. In this embodiment, to reduce the amount of feedback information, a set of delay value candidates is sent to each mobile station in advance, and the mobile station selects optimum delay values from the delay value candidates and sends the selection result to the base station.

Figure 14:
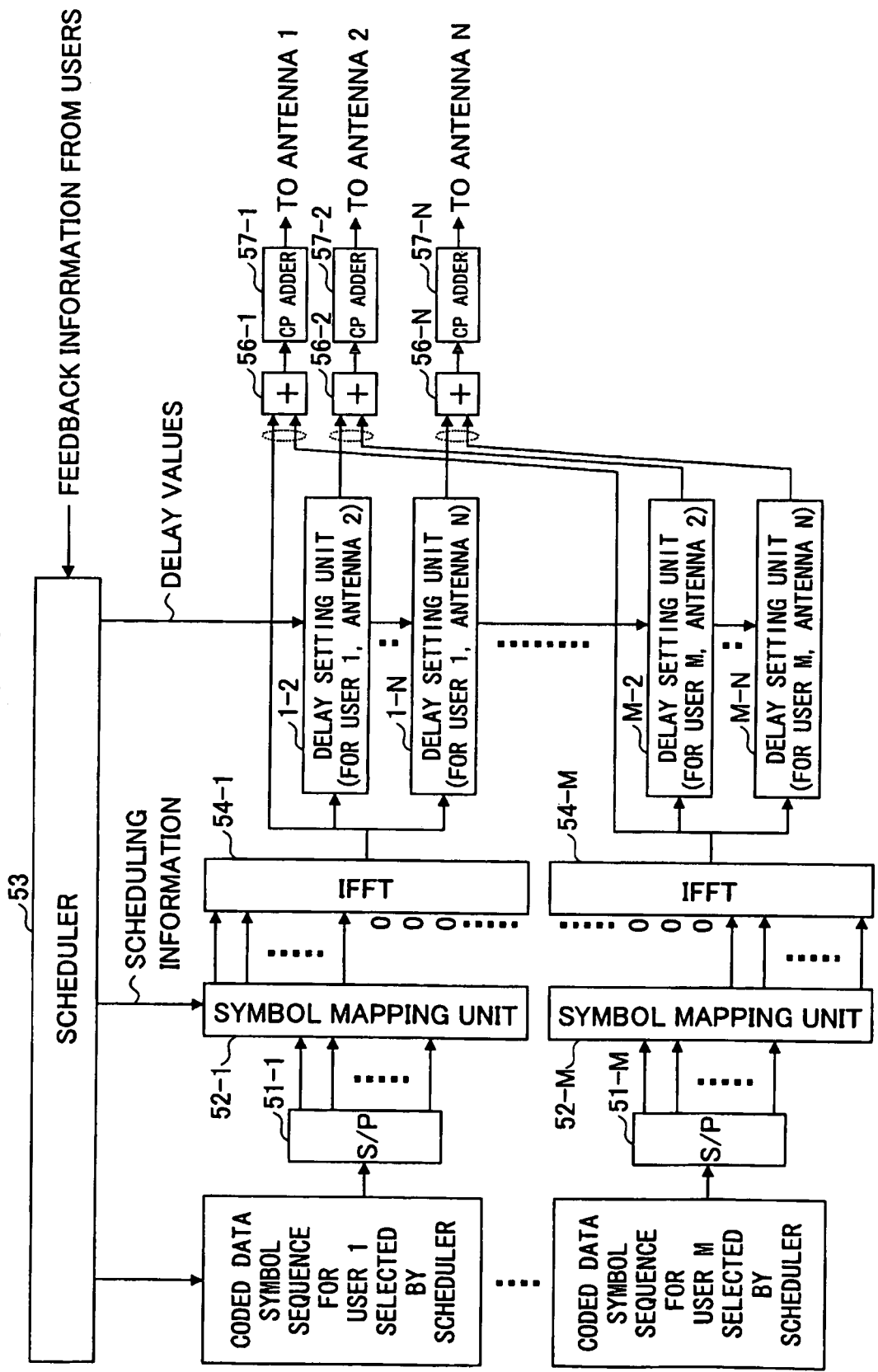
FIG. 14 is a partial block diagram of a base station according to another embodiment of the present invention.

FIG. 14 is a partial block diagram of a base station according to the fifth embodiment of the present invention. The base station shown in FIG. 14 includes serial-parallel converters (S/Ps) 51-1 through 51-M; symbol mapping units 52-1 through 52-M; a scheduler 53; inverse fast Fourier transformers (IFFTs) 54-1 through 54-M; delay setting units 1-2 through 1-N, ..., and M-2 through M-N; multiplexing units 56-1 through 56-N; and cyclic prefix (CP) adders 57-1 through 57-N. In other words, the base station of this embodiment is different from the base station shown in FIG. 5 in that the delay generator 55 is omitted. In this embodiment, the scheduler 53 inputs delay values to the delay setting units 1-2 through 1-N, ..., and M-2 through M-N.

The scheduler 53 performs frequency scheduling based on feedback information, such as combinations of CQIs and delay values, sent from the mobile stations for each frequency resource block. The CQI refers to the quality of a downlink pilot channel and may be represented by, for example, an SIR or SINR. The scheduler 53 determines a mobile station in a good channel condition for each frequency resource block and allocates the frequency resource block preferentially to the determined mobile station. The scheduler 53 sends the scheduling information to the symbol mapping units 52-1 through 52-M.

Figure 15:
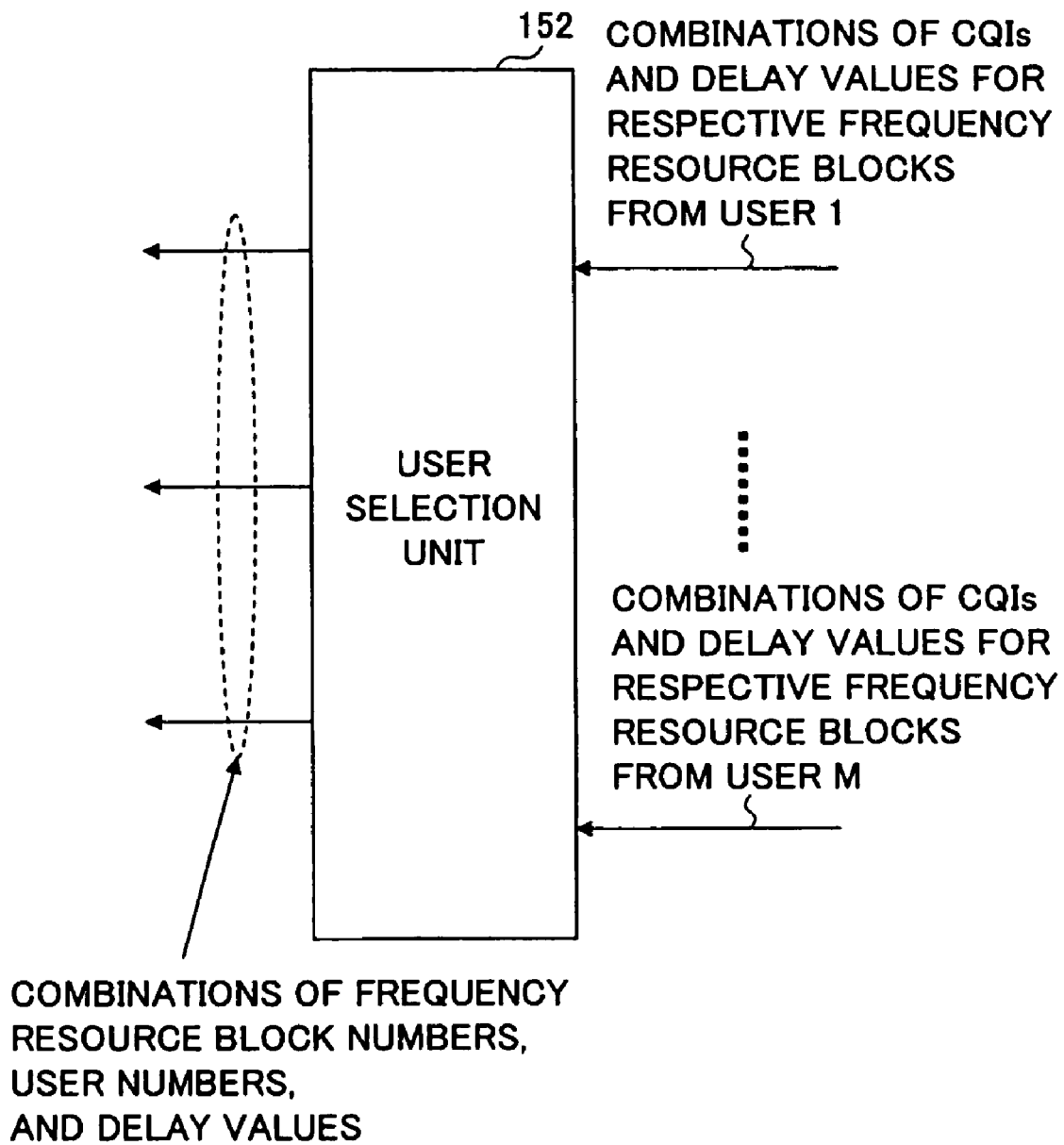
FIG. 15 is a block diagram of a scheduler according to another embodiment of the present invention.

The scheduler 53 includes a user selection unit 152 as shown in FIG. 15. The user selection unit 152 receives combinations of CQIs and delay values from users (mobile stations) for each frequency resource block. Then, based on the combinations of CQIs and delay values, the user selection unit 152 selects a user with the highest CQI for each frequency resource block. The user selection unit 152 outputs combinations of frequency resource block numbers of the frequency resource blocks, user numbers of the users assigned to the frequency resource blocks, and delay values used for the users. The frequency resource block numbers and the user numbers of the users assigned to the frequency resource blocks are input as the scheduling information to the symbol mapping units 51-1 through 51-M, and the delay values are input to the delay setting units 1-2 through 1-N, ..., and M-2 through M-N.

The symbol mapping units 51-1 through 51-M map data symbols for the mobile stations to the corresponding frequency resource blocks allocated to the users. As described above, the entire frequency band available in the system is divided into multiple frequency resource blocks each of which includes one or more subcarriers. The frequency resource blocks are also called frequency chunks. One or more frequency resource blocks may be allocated to one mobile station.

The delay setting units 1-2 through 1-N, ..., and M-2 through M-N set delay values for one or more signal paths leading to transmitting antennas based on the delay values input from the scheduler 53. In this example, the delay values are set for N-1 signal paths leading to transmitting antennas other than the first transmitting antenna because the delay values specify relative delays between N transmitting antennas. Alternatively, delay values may be set for all N transmitting antennas including the first transmitting antenna. In FIG. 14, delay values are set separately for the respective frequency resource blocks and the respective mobile stations or users. Alternatively, the same delay values may be used for all frequency resource blocks. Also, delay values may be set separately for each group of frequency resource blocks.

Figure 16:
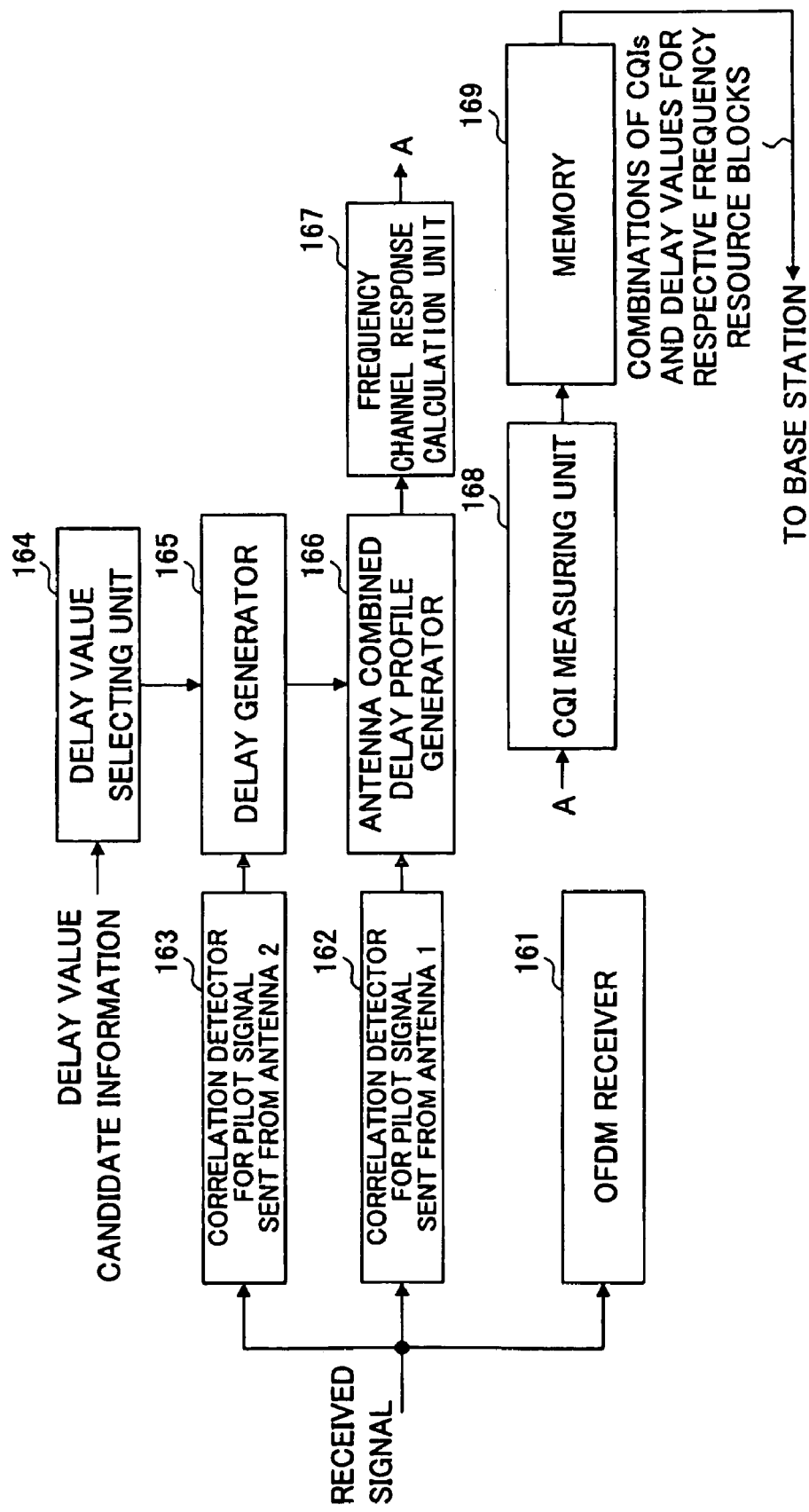
FIG. 16 is a schematic block diagram of a mobile station according to another embodiment of the present invention.

FIG. 16 is a schematic block diagram of a mobile station according to the fifth embodiment of the present invention. The mobile station of this embodiment includes an OFDM receiver 161, correlation detectors 162 and 163, a delay value selecting unit 164, a delay generator 165, an antenna combined delay profile generator 166, a frequency channel response calculation unit 167, a CQI measuring unit 168, and a memory 169.

The OFDM receiver 161 OFDM-demodulates (Fourier-transforms) a received signal and restores data in the received signal.

Each of the correlation detectors 162 and 163 calculates the correlation between a received signal (pilot channel) and a pilot channel replica and outputs the correlation calculation result. Specifically, the correlation detector 162 calculates the correlation between a pilot channel and a pilot channel replica sent from one transmitting antenna (antenna 1) of the base station and received by the mobile station. The correlation detector 163 calculates the correlation between a pilot channel and a pilot channel replica sent from another transmitting antenna (antenna 2) of the base station and received by the mobile station.

For example, before starting communications, the base station sends pilot channels from two of N transmitting antennas and the mobile station receives the pilot channels. Because a radio signal normally propagates via multiple paths, a received signal includes multiple incoming waves (a group of paths) extending over a certain time range. The correlation calculation result provides a delay profile (a first delay profile) showing such multiple paths.

The delay value selecting unit 164 selects delay values from delay value candidates in delay value candidate information sent from the base station. For example, as shown in FIG. 17, the delay value candidate information includes a finite number of delay value candidates and candidate numbers assigned to the delay value candidates. In this example, candidate numbers #1 through #n are assigned to delay values $\tau_1$ through $\tau_n$. The delay value selecting unit 164 selects the delay values $\tau_1$ through $\tau_n$ and inputs the selected delay values to the delay generator 165. Each delay value is, for example, about several multiples of 0.01 μs.

The delay generator 165 delays the delay profile input from the correlation detector 163 based on the input delay values to obtain delay profiles (second delay profiles) and inputs the obtained second delay profiles to the antenna combined delay profile generator 166.

The antenna combined delay profile generator 166 combines a delay profile input from the correlation detector 162 and signals (the second delay profiles) from the delay generator 165 to generate combined delay profiles, and inputs the combined delay profiles to the frequency channel response calculation unit 167.

The frequency channel response calculation unit 167 converts the combined delay profiles into response characteristics (frequency domain response characteristics) on a frequency axis and inputs the response characteristics to the CQI measuring unit 168.

The CQI measuring unit 168 measures CQIs for the respective frequency resource blocks based on the frequency domain response characteristics.

The memory 169 stores and outputs the highest CQI and the corresponding delay value(s) for each frequency resource block.

Figure 18:
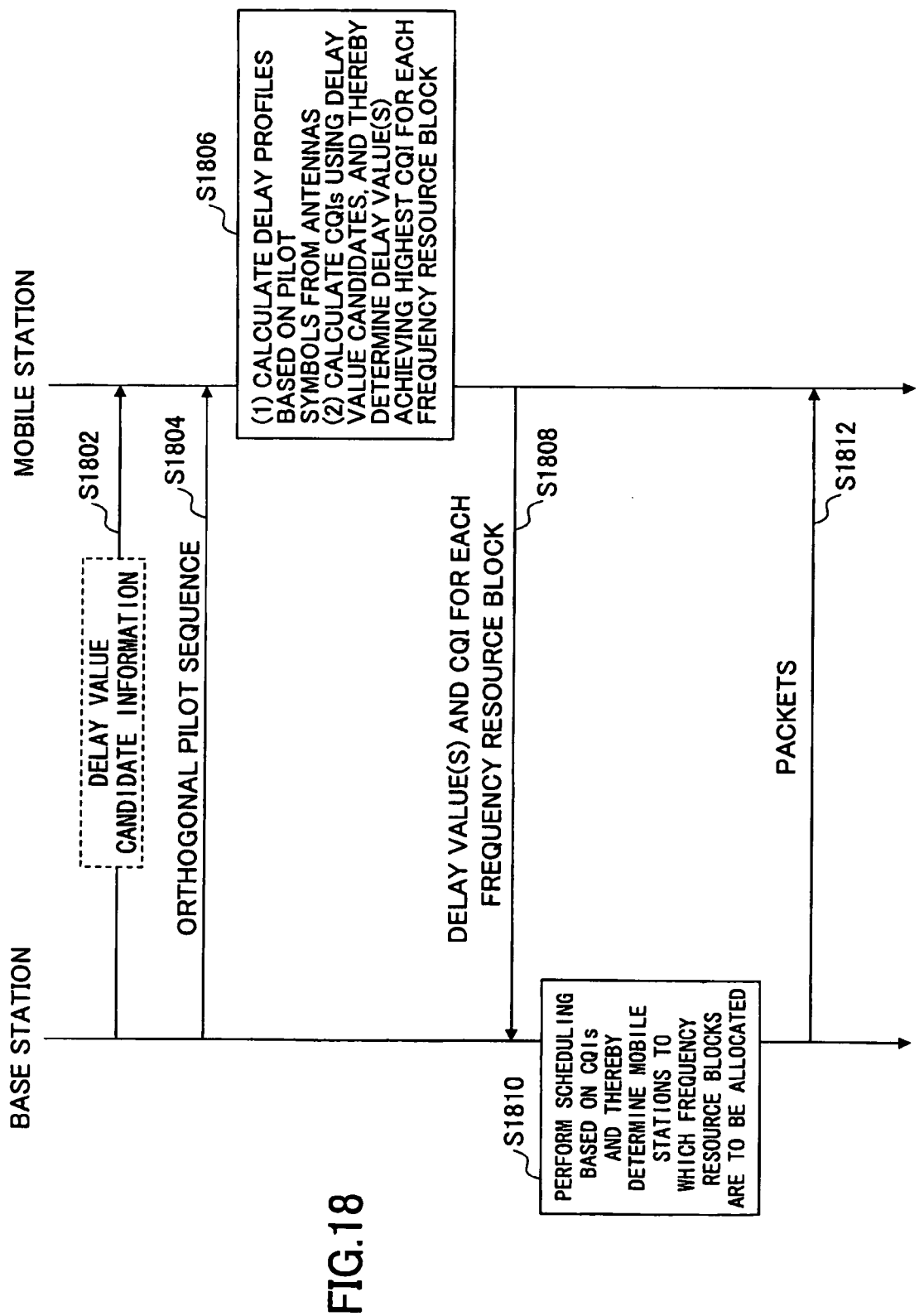
FIG. 18 is a sequence chart showing another exemplary process in a communication system according to an embodiment of the present invention.

FIG. 18 is a sequence chart showing an exemplary process in a communication system according to the fifth embodiment of the present invention. In step S1802, the base station sends delay value candidate information to the mobile stations. For example, the base station sends the delay value candidate information as broadcast information to be broadcast within a cell. Broadcasting the delay value candidate information makes it possible to adaptively control the system according to the status of the cell. Also, compared with a case where the delay value candidate information is sent separately to each user, this method makes it possible to reduce the overhead required to send the delay value candidate information. Alternatively, the base station may be configured to send the delay value candidate information as L2/L3 information, i.e., as information for each user, via an upper level signal. This approach makes it possible to send different information to the respective users and thereby to perform adaptive control depending on the user conditions. Further, a set of candidates may be determined by specifications between the base station and the mobile stations. This approach eliminates the need to explicitly inform the mobile stations of the delay value candidates and thereby makes it possible to reduce (or eliminate) the overhead required to send the delay value candidate information. In this case, step S1802 is not necessary.

Figure 19A:
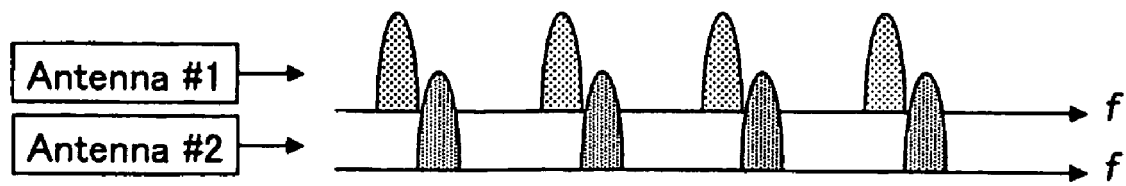
FIG. 19A is a drawing illustrating a pilot multiplexing method used in an embodiment of the present invention.
Figure 19B:
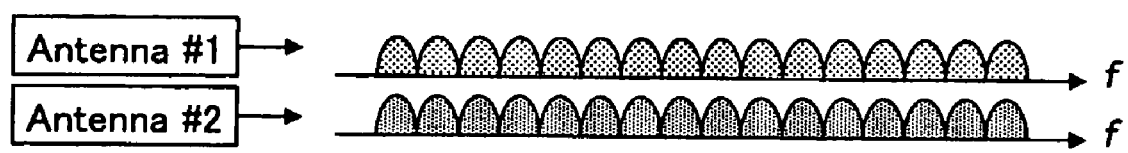
FIG. 19B is a drawing illustrating another pilot multiplexing method used in an embodiment of the present invention.

In step S1804, pilot symbols (pilot channels) are sent from the N transmitting antennas at different timings according to the assigned delay values. In other words, an orthogonal pilot sequence is sent from each antenna. For example, as shown in FIG. 19A, the base station sends pilot signals using frequency division multiplexing (FDM) from N=2 antennas. Alternatively, as shown in FIG. 19B, the base station may be configured to send pilot signals using code division multiplexing (CDM) from N=2 antennas.

In step S1806, each of the mobile stations calculates delay profiles based on the pilot symbols sent from the antennas, calculates CQIs using the delay value candidates, and thereby determines a delay value(s) that achieves the highest CQI for each frequency resource block. For example, the mobile station receives a pilot signal sent from a transmitting antenna of the base station, calculates a first delay profile, receives another pilot signal sent from another transmitting antenna of the base station, calculates second delay profiles based on predetermined delay value (delay time) candidates, estimates channel quality indicators for each frequency resource block based on the first and second delay profiles, and thereby obtains delay values for one or more transmitting antennas and channel quality indicators estimated based on the delay values.

In step S1808, each of the mobile stations feeds back the delay values and CQIs for the respective frequency resource blocks to the base station.

In step S1810, the base station performs scheduling based on the CQIs and thereby determines mobile stations to which frequency resource blocks are to be allocated.

In step S1812, the base station sends packets using the obtained delay values.

Sixth Embodiment

In the above embodiments, only delay values are controlled. In a sixth embodiment of the present invention, phase rotation angles are controlled in addition to delay values.

Figure 20:
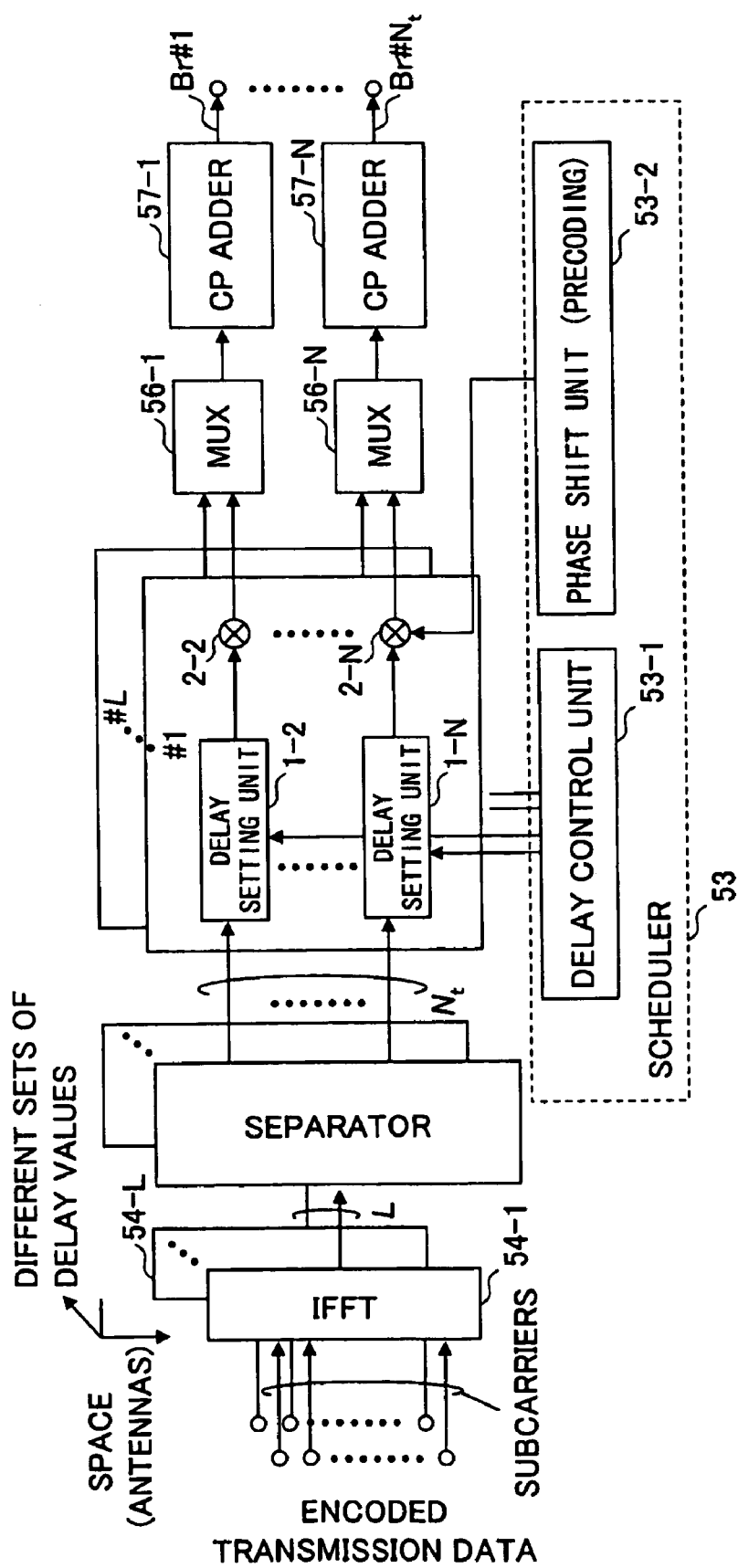
FIG. 20 is a partial block diagram of a base station according to another embodiment of the present invention.

As shown in FIG. 20, the base station of this embodiment further includes a phase shift unit provided downstream of the CDD. More specifically, the base station includes multipliers 2-2 through 2-N to which output signals are input from delay setting units 1-2 through 1-N. Output signals from the multipliers 2-2 through 2-N are input to the multiplexing units 56-1 through 56-N. Phase shift angles are also input to the multipliers 2-2 through 2-N from a phase shift unit 53-2.

In this example, delay values are set for all N transmitting antennas including the first transmitting antenna. Alternatively, delay values may be set only for N−1 signal paths leading to transmitting antennas other than the first transmitting antenna as in the above embodiments because delays can be specified as relative delays between N transmitting antennas. In FIG. 20, delay values are set separately for the respective frequency resource blocks and the respective mobile stations or users. Alternatively, the same delay values may be used for all frequency resource blocks. Also, delay values may be set separately for each group of frequency resource blocks.

The mobile station used in this embodiment has substantially the same configuration as that of the mobile station described with reference to FIG. 16.

The delay value selecting unit 164 selects delay values and phase rotation angles from delay value candidates and phase rotation angle candidates in delay-value-and-phase-rotation-angle candidate information sent from the base station. As shown in FIG. 21, the delay-value-and-phase-rotation-angle candidate information includes a finite number of delay value candidates and phase rotation angle candidates, and candidate numbers assigned to the candidates. For example, the delay-value-and-phase-rotation-angle candidate information may include delay values $\tau_1$ through $\tau_n$ and phase rotation angles $\theta_1$ through $\theta_n$ (n represents an integer greater than 1) that are assigned to candidate numbers #1 through #n. In FIG. 21, n represents 4. The delay value selecting unit 164 selects pairs of the delay values $\tau_1$ through $\tau_n$ and the phase rotation angles $\theta_1$ through $\theta_n$ and inputs the selected pairs of delay values and phase rotation angles to the delay generator 165. Each delay time is, for example, about several multiples of 0.01 μs.

The delay generator 165 delays and phase-rotates the delay profile input from the correlation detector 163 based on the pairs of delay values and phase rotation angles to obtain delay profiles (second delay profiles) and inputs the obtained second delay profiles to the antenna combined delay profile generator 166.

The antenna combined delay profile generator 166 combines a delay profile input from the correlation detector 162 and signals (the second delay profiles) from the delay generator 165 to generate combined delay profiles, and inputs the combined delay profiles to the frequency channel response calculation unit 167.

The frequency channel response calculation unit 167 converts the combined delay profiles into response characteristics (frequency domain response characteristics) on a frequency axis and inputs the response characteristics to the CQI measuring unit 168.

The CQI measuring unit 168 measures CQIs for the respective frequency resource blocks based on the frequency domain response characteristics.

The memory 169 stores and outputs the highest CQI and the corresponding delay value(s) for each frequency resource block.

The present international application claims priority from Japanese Patent Application No. 2006-010495 filed on Jan. 18, 2006 and Japanese Patent Application No. 2006-127990 filed on May 1, 2006, the entire contents of which are hereby incorporated herein by reference.

The invention claimed is:

1. A communication device for sending transmission signals for one or more mobile stations from multiple transmitting antennas, comprising:
 a scheduling unit configured to allocate one or more frequency resource blocks each having a predetermined bandwidth and including one or more subcarriers preferentially to each selected one of the mobile stations that is in a good channel condition;

one or more delay setting units provided between the scheduling unit and the transmitting antennas and configured to set delay values for one or more signal paths leading to the transmitting antennas; and a delay value updating unit configured to repeatedly update the delay values to be set by the delay setting units, wherein the delay value updating unit is configured to randomly vary the delay values, wherein the delay values are generated from random numbers, the communication device further comprising:

a monitoring unit configured to monitor throughput of the transmission signals; and a range calculation unit configured to calculate a range of the delay values with which the throughput becomes higher than a predetermined level;

wherein the next set of the delay values are generated from the random numbers within the calculated range.

2. The communication device as claimed in claim 1, wherein
the communication device is configured to receive delay profiles from the mobile stations; and
the scheduling unit is configured to calculate channel quality indicators for the respective frequency resource blocks based on the delay profiles received from the mobile stations and to allocate one or more of the frequency resource blocks preferentially to each selected one of the mobile stations that is in a good channel condition.

3. The communication device as claimed in claim 1, wherein the communication device is configured to receive the delay values for one or more of the transmitting antennas and channel quality indicators estimated based on the delay values for the respective frequency resource blocks from the mobile stations.

4. The communication device as claimed in claim 1, wherein the delay values are set separately for the respective frequency resource blocks.

5. The communication device as claimed in claim 1, wherein the delay values are set separately for each group of the frequency resource blocks.

6. The communication device as claimed in claim 1, wherein
the communication device is configured to receive the delay values from the mobile stations; and
the delay setting units are configured to set the delay values sent from the mobile stations.

7. A mobile station used in a communication system where frequency scheduling and delay diversity using multiple transmitting antennas are performed, the mobile station comprising:
a first delay profile calculation unit configured to receive a pilot signal sent from one of the transmitting antennas and to calculate a first delay profile;
a delay generator configured to generate delay values for one or more of the transmitting antennas;
a second delay profile calculation unit configured to calculate second delay profiles based on the first delay profile which second delay profiles are observed at the mobile station if the delay values generated by the delay generator are applied to one or more signal paths leading to the transmitting antennas;
an estimating unit configured to estimate channel quality indicators for each frequency resource block based on the second delay profiles; and
a transmission unit configured to send delay values for one or more of the transmitting antennas and the channel quality indicators estimated based on the delay values to a base station.

8. A mobile station used in a communication system where frequency scheduling and delay diversity using multiple transmitting antennas are performed, the mobile station comprising:
a first delay profile calculation unit configured to receive a first pilot signal sent from one of the transmitting antennas and to calculate a first delay profile based on the first pilot signal;
a second delay profile calculation unit configured to receive a second pilot signal sent from another one of the transmitting antennas and to calculate second delay profiles based on the second pilot signal and predetermined delay value candidates;
an estimating unit configured to estimate channel quality indicators for each frequency resource block based on the first and second delay profiles; and
a transmission unit configured to send delay values for one or more of the transmitting antennas and the channel quality indicators estimated based on the delay values to a base station.

9. The mobile station as claimed in claim 8, wherein the delay value candidates are sent from the base station.

10. The mobile station as claimed in claim 8, wherein the pilot signals are sent using frequency division multiplexing or code division multiplexing.

11. A method used in a communication system where frequency scheduling and delay diversity using multiple transmitting antennas are performed, the method comprising the steps of:
receiving channel quality indicators of a downlink pilot channel from mobile stations;
performing scheduling by allocating one or more frequency resource blocks each having a predetermined bandwidth and including one or more subcarriers preferentially to each selected one of the mobile stations that is in a good channel condition based on the channel quality indicators;
sending transmission signals for one or more of the mobile stations from the transmitting antennas according to the scheduling results;
updating delay values set for one or more signal paths leading to the transmitting antennas;
randomly varying the delay values; and
sending the downlink pilot channel
the method further comprising:
generating the delay values from random numbers,
monitoring throughput of the transmission signals;
calculating a range of the delay values with which the throughput becomes higher than a predetermined level; and
generating the next set of the delay values from the random numbers within the calculated range.

* * * * *